(12) United States Patent
Matsumoto et al.

(10) Patent No.: US 7,833,063 B2
(45) Date of Patent: Nov. 16, 2010

(54) CARD CONNECTOR

(75) Inventors: Yasuyoshi Matsumoto, Yamato (JP);
Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/992,281

(22) PCT Filed: Sep. 22, 2006

(86) PCT No.: PCT/US2006/037004
§ 371 (c)(1),
(2), (4) Date: Apr. 13, 2009

(87) PCT Pub. No.: WO2007/038285
PCT Pub. Date: Apr. 5, 2007

(65) Prior Publication Data
US 2009/0221174 A1    Sep. 3, 2009

(30) Foreign Application Priority Data
Sep. 22, 2005    (JP) .............................. 2005-274943

(51) Int. Cl.
*H01R 24/00* (2006.01)
(52) U.S. Cl. ........................................ 439/630
(58) Field of Classification Search ............... 439/630, 439/188, 631, 374, 157–160, 138–140
See application file for complete search history.

(56) References Cited

U.S. PATENT DOCUMENTS

| | | | |
|---|---|---|---|
| 3,953,712 A * | 4/1976 | Horvath | 235/449 |
| 6,672,904 B1 | 1/2004 | Chen | |
| 6,783,399 B2 | 8/2004 | Joung | |
| 6,843,670 B2 * | 1/2005 | Yamaguchi et al. | 439/159 |
| 6,900,982 B2 * | 5/2005 | Chang et al. | 361/679.31 |
| 6,908,321 B1 * | 6/2005 | Lai | 439/140 |
| 7,025,609 B2 * | 4/2006 | Matsumoto et al. | 439/138 |
| 7,108,558 B2 * | 9/2006 | Zhu et al. | 439/630 |
| 7,112,095 B2 * | 9/2006 | Shen et al. | 439/630 |
| 7,118,420 B1 * | 10/2006 | Lai et al. | 439/630 |
| 7,377,814 B2 * | 5/2008 | Shen et al. | 439/630 |
| 7,445,512 B1 * | 11/2008 | Lai | 439/630 |
| 2004/0137794 A1 | 7/2004 | Kuroda et al. | |
| 2004/0192096 A1 | 9/2004 | Sato et al. | |
| 2009/0221174 A1 * | 9/2009 | Matsumoto et al. | 439/374 |

OTHER PUBLICATIONS

International Search Report for PCT/US2006/037004.

* cited by examiner

*Primary Examiner*—Neil Abrams
*Assistant Examiner*—Harshad C Patel
(74) *Attorney, Agent, or Firm*—Timothy M. Morella

(57) ABSTRACT

A card connector (10) may receive first and second cards includes a housing (11) having an insertion opening for receiving cards (51a and 51b), a plurality of first connection terminals (15a) disposed in the housing and configured to engage pads of the first card (51a) and a plurality of second connection terminals (15b) disposed in said housing and configured to engage pads of the second card (51b). A guide member (21) is movably attached to the housing (11) at a position between the second connection terminals (15b) and the insertion opening and is adapted to engage an inserted card and direct the card to one of a first path and a second path to properly position the first and second cards upon insertion into the card connector.

11 Claims, 20 Drawing Sheets

CARD CONNECTOR

BACKGROUND OF THE INVENTION

1. Field of the Invention

The present invention relates generally to electrical connectors and more particularly to a card connector.

2. Description of the Related Art

Conventionally, electronic devices, such as personal computers, mobile telephones, personal digital assistants (PDAs), digital cameras, video cameras, music players, game machines, and vehicle navigation devices, include card connectors so as to enable use of various types of memory cards, such as subscriber identity module (SIM) cards, multi-media cards (MMCs), secure digital (SD) cards, mini SD cards, xD picture cards, memory sticks, memory sticks Duo, and smart media.

With recent downsizing of electronic equipment, memory cards likewise tend to be rapidly reduced in size. Therefore, there has been proposed a so-called two-in-one type card connector which can receive not only a memory card of an ordinary size but also a memory card of a reduced size (see Japanese Patent Application Laid-Open (kokai) No. 2004-311416 and Japanese Utility Model Registration No. 3105276).

FIG. 19 is a view showing a conventional card connector as disclosed in Japanese Utility Model Registration No. 3105276. In FIG. 19, reference numeral 302 denotes a large memory card, and 303 denotes a small memory card. The card connector includes a housing 304, a terminal set 305 mounted on the housing 304, and a shell 310 attached to the housing 304 to cover the upper surface of the housing 304. The terminal set 305 includes first connection terminals 306 which come into connection with pads of the large memory card 302, a second connection terminals 307 which come into connection with pads of the small memory card 303 and lever members 308 which elastically grasp the side surfaces of the large memory card 302 or the small memory card 303 from the opposite sides thereof. The housing 304 also includes an urging member 311 which comes into contact with the upper surface of the large memory card 302 or the small memory card 303 and urges it downward.

The card connector has an opening at its front end. The large memory card 302 and the small memory card 303 are selectively inserted and loaded into the card connector via the opening. In the loaded state, the rear ends of the large memory card 302 and the small memory card 303 project the same distance from the opening. The pads disposed in the vicinity of the front end of the large memory card 302 come into contact with the first connection terminals 306 located at a deeper position within the card connector. The pads disposed in the vicinity of the front end of the small memory card 303 come into contact with the second connection terminals 307 located at a position near the opening of the card connector.

By virtue of the above-described configuration, the large memory card 302 and the small memory card 303 can be selectively loaded into the card connector.

However, since the conventional card connector does not include an identification-guide mechanism for identifying the type of an inserted memory card and guiding the memory card to a position corresponding to the card type, the memory card may be inserted to an improper position within the card connector with a resultant failure to establish proper electrical connection between the memory card and the card connector, or with resultant damage to the components of the card connector. Further, since the conventional card connector does not include a push-push mechanism which enables an operator to push a memory card for removal from the card connector as well as to insert the memory card into the card connector, the conventional connector is unsatisfactory in terms of convenience of use.

Although the conventional two-in-one type card connector disclosed in Japanese Patent Application Laid-Open No. 2004-311416 has an identification-guide mechanism and a push-push mechanism, the connector includes a large number of components, resulting in a complex structure, and increased size and weight. Therefore, mounting such a card connector on a small electronic device is difficult.

SUMMARY OF THE INVENTION

An object of the present invention is to solve the above-mentioned problems of conventional card connectors and to provide a card connector which includes a swing plate member for identifying the type of a card and directing the card to an upper or lower side, and a vertically-movable plate member which serves as a bottom wall of a passageway for the upwardly directed card or a top wall of a passageway for the downwardly directed card, which has a simplified structure, which can reduce cost and size, and which enables easy and reliable loading of cards of a plurality of types.

In order to achieve the above object, the present invention provides a card connector comprising an insertion opening through which one of a first card and a second card, which have different outer dimensions, is selectively inserted into the card connector; a housing for accommodating the first card and the second card; first connection terminals disposed at a position away from the insertion opening and coming into contact with card-side connection terminals of the first card; second connection terminals disposed at a position between the first connection terminals and the insertion opening and coming into contact with card-side connection terminals of the second card; a card guide mechanism including an urging member for urging the inserted first or second card in a direction opposite the insertion direction and adapted to stop the inserted first or second card at a lock position, and, when the inserted first or second card moves in the insertion direction to an end point as a result of a push operation of pushing the inserted first or second card in the insertion direction, move the inserted first or second card by urging force of the urging member from the end point in the direction opposite the insertion direction to thereby eject the first or second card; a swing plate member swingably attached to the housing at a position between the second connection terminals and the insertion opening and adapted to determine whether an inserted card is the first card or the second card and direct the card to an upper side or a lower side; and a vertically-movable plate member vertically movably attached to the housing at a position opposite the insertion opening with respect to the swing plate member and adapted to serve as a bottom wall of a passageway for the first card or a top wall of a passageway for the second card.

Preferably, the swing plate member includes stoppers for disabling, at an initial position, the swing plate member from swinging, the stopper being released upon insertion of the first card into the insertion opening and enabling the swing plate member to swing.

Preferably, the swing plate member is urged by an urging member to return to the initial position.

Preferably, the swing plate member includes a plate-shaped gate portion extending downward toward a direction opposite the insertion opening of the housing in an initial position, and moving upward and becoming parallel to the insertion direction when the swing plate member swings from the initial position.

Preferably, the swing plate member swings about a swing center defined with respect to the insertion direction; the stopper is located on one side of the swing center toward the insertion opening; and the gate portion is located on the other side of the swing center opposite the insertion opening.

Preferably, when a front end of the first card with respect to the insertion direction comes into contact with the gate portion, the swing plate member swings from the initial position, so that the gate portion moves upward and serves as the top wall of the passageway for the first card; and when a front end of the second card with respect to the insertion direction comes into contact with the gate portion, the swing plate member does not swing from the initial position, so that the gate portion guides the second card in a downwardly inclined direction.

Preferably, the vertically-movable plate member includes an urging member for urging the vertically-movable plate member upward; and a plate-shaped pressure-receiving portion, wherein in an initial state, the vertically-movable plate member is urged by the urging member, so that the pressure-receiving portion serves as the top wall of the passageway for the second card.

Preferably, the pressure-receiving portion is located above the second connection terminals.

Preferably, when a chamfer portion formed at a lower edge of the front end of the first card with respect to the insertion direction comes into contact with an end edge of the pressure-receiving portion on the side toward the insertion opening, the vertically-movable plate member moves downward, so that the pressure-receiving portion serves as the bottom wall of the passageway for the first card.

Preferably, when the swing plate member is swung as a result of insertion of the first card, an end edge of the swing plate member opposite the insertion opening moves upward, so that a vertical clearance smaller than the thickness of the first card is produced between the end edge of the swing plate member and an end edge of the vertically-movable plate member on the side toward the insertion opening.

The card connector according to the present invention includes a swing plate member for identifying the type of a card and directing the card to an upper or lower side, and a vertically-movable plate member which serves as a bottom wall of a passageway for the upwardly directed card or a top wall of a passageway for the downwardly directed card. Therefore, the card connector of the present invention has a simplified structure so that cost and size can be reduced. In addition, the card connector of the present invention enables easy and reliable loading of cards of a plurality of types.

DETAILED DESCRIPTION OF PREFERRED EMBODIMENT

Figure 1:
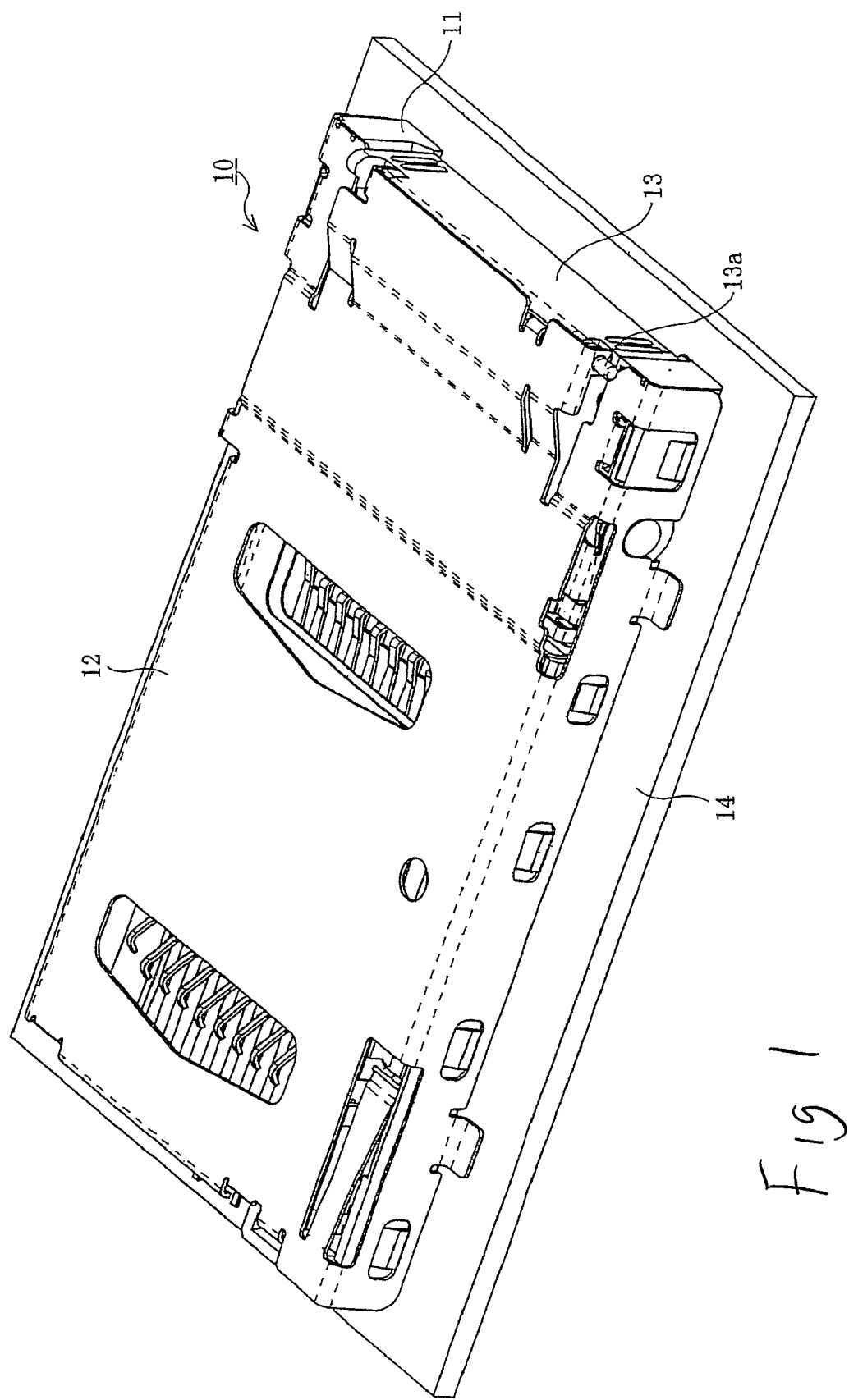
FIG. 1 is a perspective view of a card connector according to an embodiment of the present invention.

An embodiment of the present invention will next be described in detail with reference to the drawings.

In FIGS. 1 to 6, reference 10 denotes a card connector according to the present embodiment, which is mounted on a surface of a circuit board 14 attached to an unillustrated electronic device. One of a first card 51a and a second card 51b, which will be described later, is selectively loaded into the interior of the card connector 10, whereby the first card 51a or the second card 51b is attached to the electronic device via the card connector 10. The card connector 10 is of a so-called two-in-one type, and enables exclusive loading of the first card 51a or the second card 51b. The electronic device may be any type of device, such as a personal computer, a mobile telephone, a PDA, a digital camera, a video camera, a music player, a game machine, or a vehicle navigation device.

The first card 51a and the second card 51b may be any type of IC card; for example, an SIM card, MMC, SD card, mini SD card, xD picture card, memory stick, memory stick Duo, or smart media. However, in the present embodiment, descriptions will be given under the assumption that the first card 51a is a memory stick, and the second card 51b is a memory stick Duo. The memory stick has outer dimensions of 50 mm (length)×21.5 mm (width)×2.8 mm (thickness). The memory stick Duo has outer dimensions of 31 mm (length)×20 mm (width)×1.6 mm (thickness). In this case, the first card 51a is larger in outer dimensions than the second card 51b; specifically, the first card 51a is considerably larger in length and thickness than the second card 51b, and is slightly larger in width than the second card 51b. The first card 51a and the second card 51b are identical with each other in terms of the number and arrangement of card-side connection terminals; i.e., contact pads disposed on a reverse face in the vicinity of a front end with respect to an insertion direction. Notably, when the first card 51a and the second card 51b are collectively described, they are referred to as the "card 51."

In the description of the present embodiment, terms for expressing direction, such as up, down, left, right, front, and rear, are for explaining the structure and action of portions of the card connector 10. However, these terms represent respective directions for the case where the card connector 10 is used in an orientation shown in the drawings, and must be construed to represent corresponding different directions when the orientation of the card connector 10 is changed.

As shown in FIG. 1, the card connector 10 has a housing 11 integrally formed from an insulating material such as synthetic resin and accommodating the card 51, and a shell 12 formed from a plate of an electrically conductive material such as metal and through machining processes such as punching and bending. The shell 12 is attached to the upper side of the housing 11. The card connector 10 has a generally flat, parallelepiped shape, and is attached to the electronic device. The card 51 is inserted into the card connector 10 from the front (from the lower right side in FIG. 1). A shutter plate 13 for closing the insertion opening, into which the card 51 is inserted, is rotatably attached to the shell 12 via a rotation shaft 13a. An unillustrated shutter spring formed of, for example, a spiral torque spring is disposed on the rotation shaft 13a, so that the shutter spring urges the shutter plate 13 to close the insertion opening. When the card 51 is inserted into the card connector 10, a force with which a user inserts the card 51 into the insertion opening with his/her finger, etc. exceeds the urging force of the shutter spring, so that the shutter plate 13 rotates about the rotation shaft 13a and exposes the insertion opening.

Figure 2:
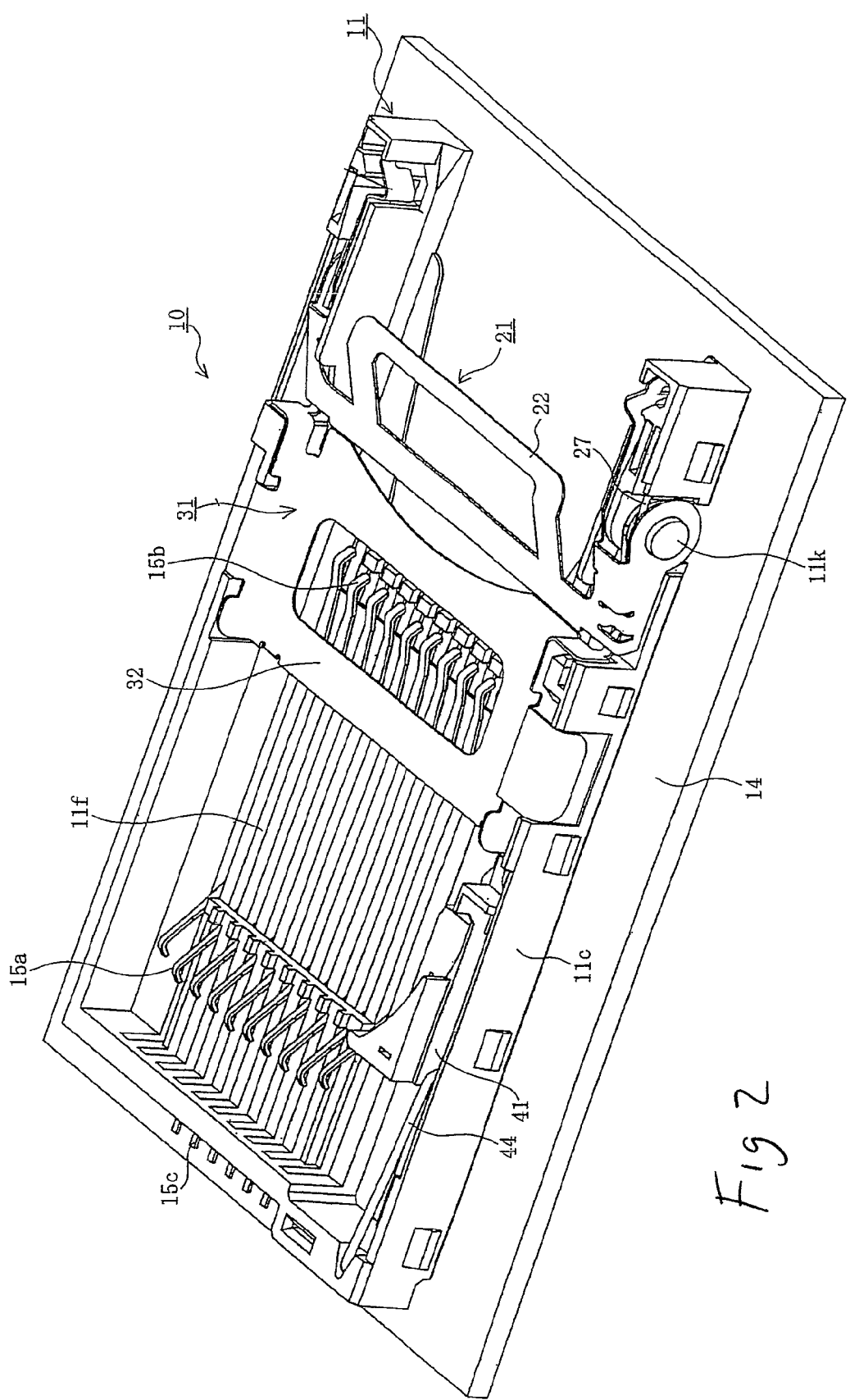
FIG. 2 is a perspective view of the card connector according to the embodiment with a shell thereof removed.
Figure 3:
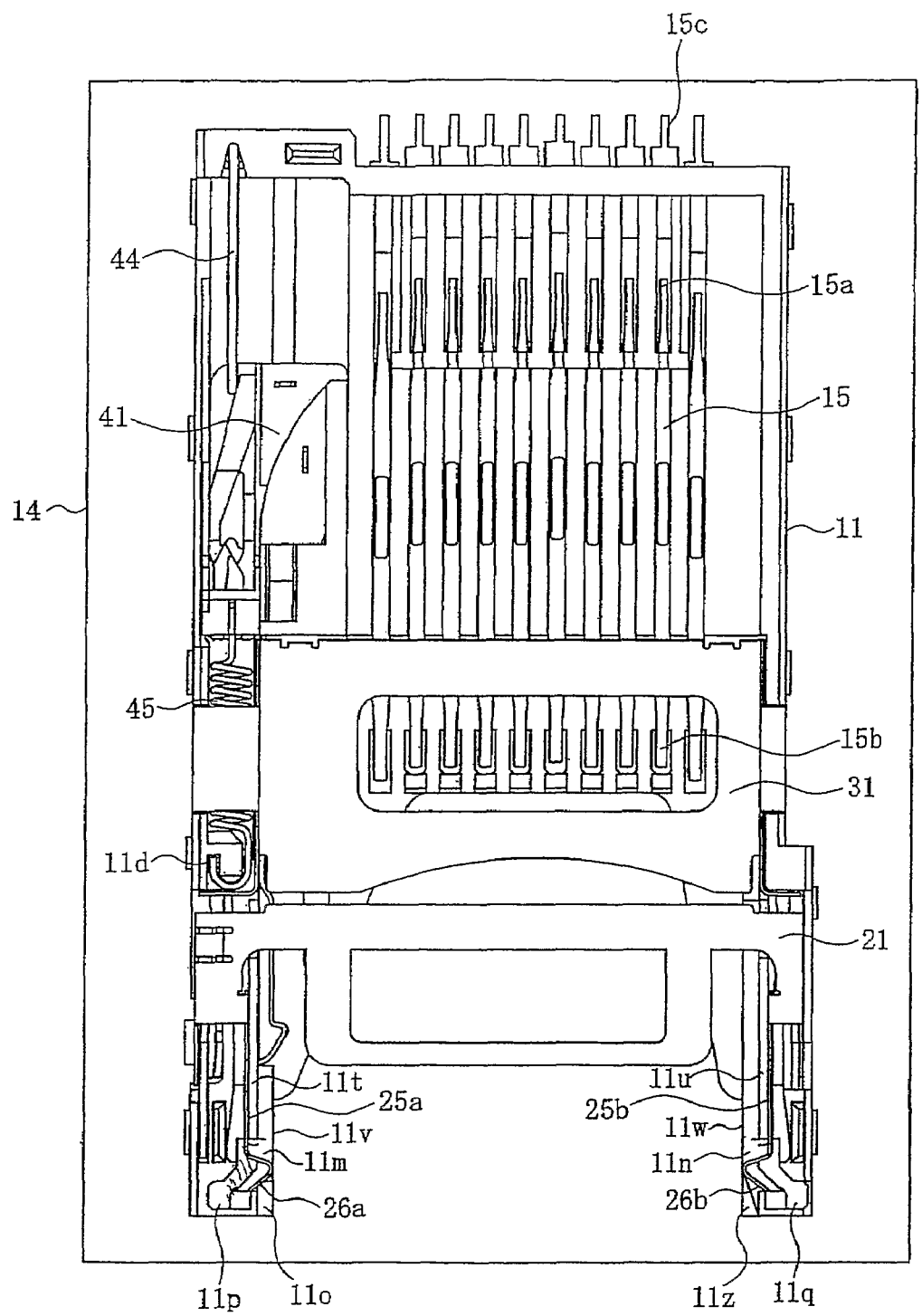
FIG. 3 is a plan view of the card connector according to the embodiment with the shell removed.
Figure 3A:
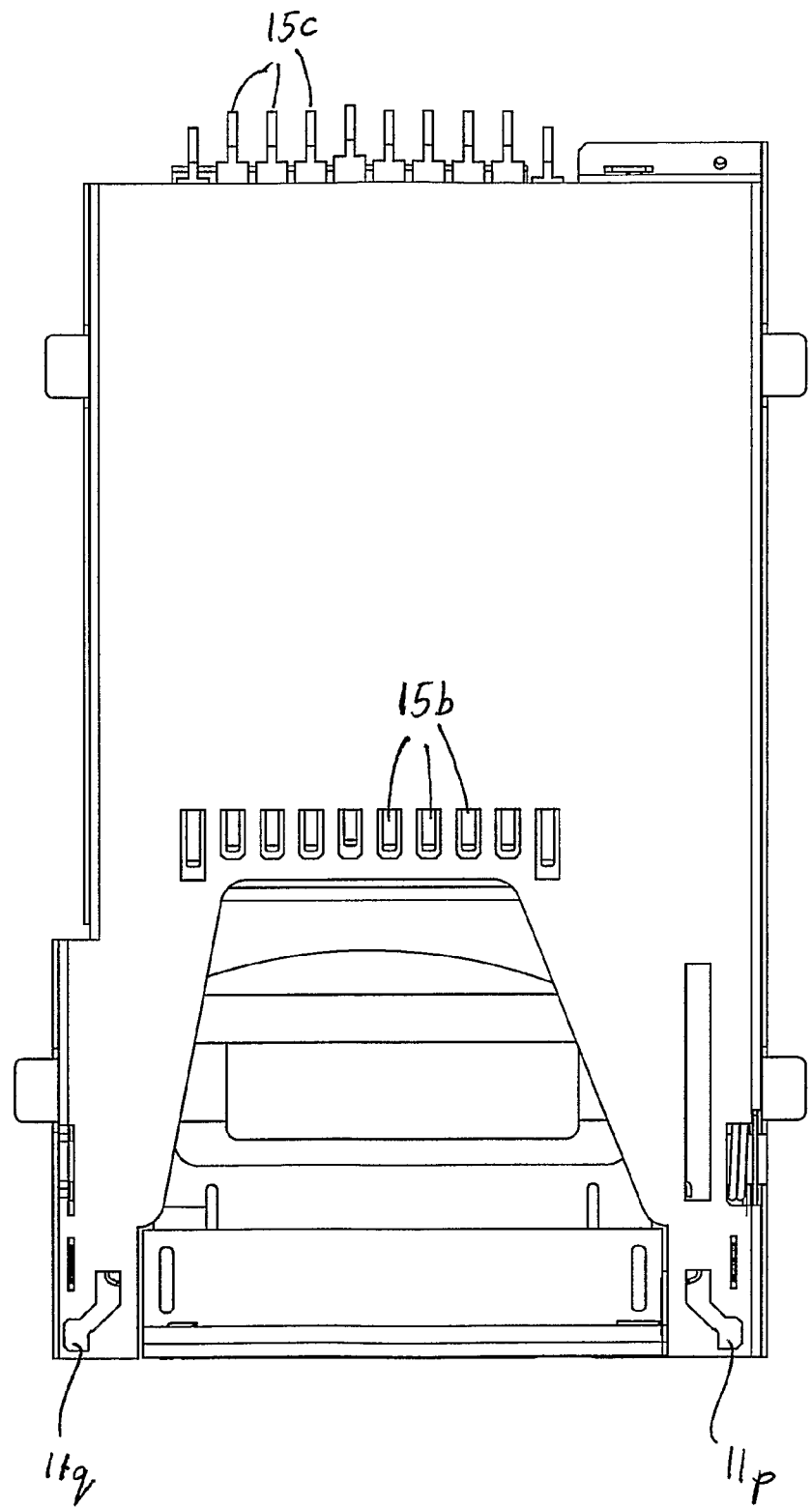
FIG. 3a is a bottom view of the card connector of FIG. 1.

FIGS. 2 and 3 show the card connector 10, with the shell 12 removed for facilitating comprehension. As shown in FIGS. 2 and 3, a changer (guide or swing plate member) 21, an inner shell (vertically-movable plate member) 31, and terminals (connector-side connection terminals) 15 are attached to the housing 11. The changer 21 is adapted to identify the first card 51a and the second card 51b and direct these cards to an upper side and a lower side, respectively. The inner shell 31 is adapted to serve as a bottom wall of a passageway for the first card 51a directed to the upper side, or a top wall of a passageway for the second card 51b directed to the lower side.

Figure 4:
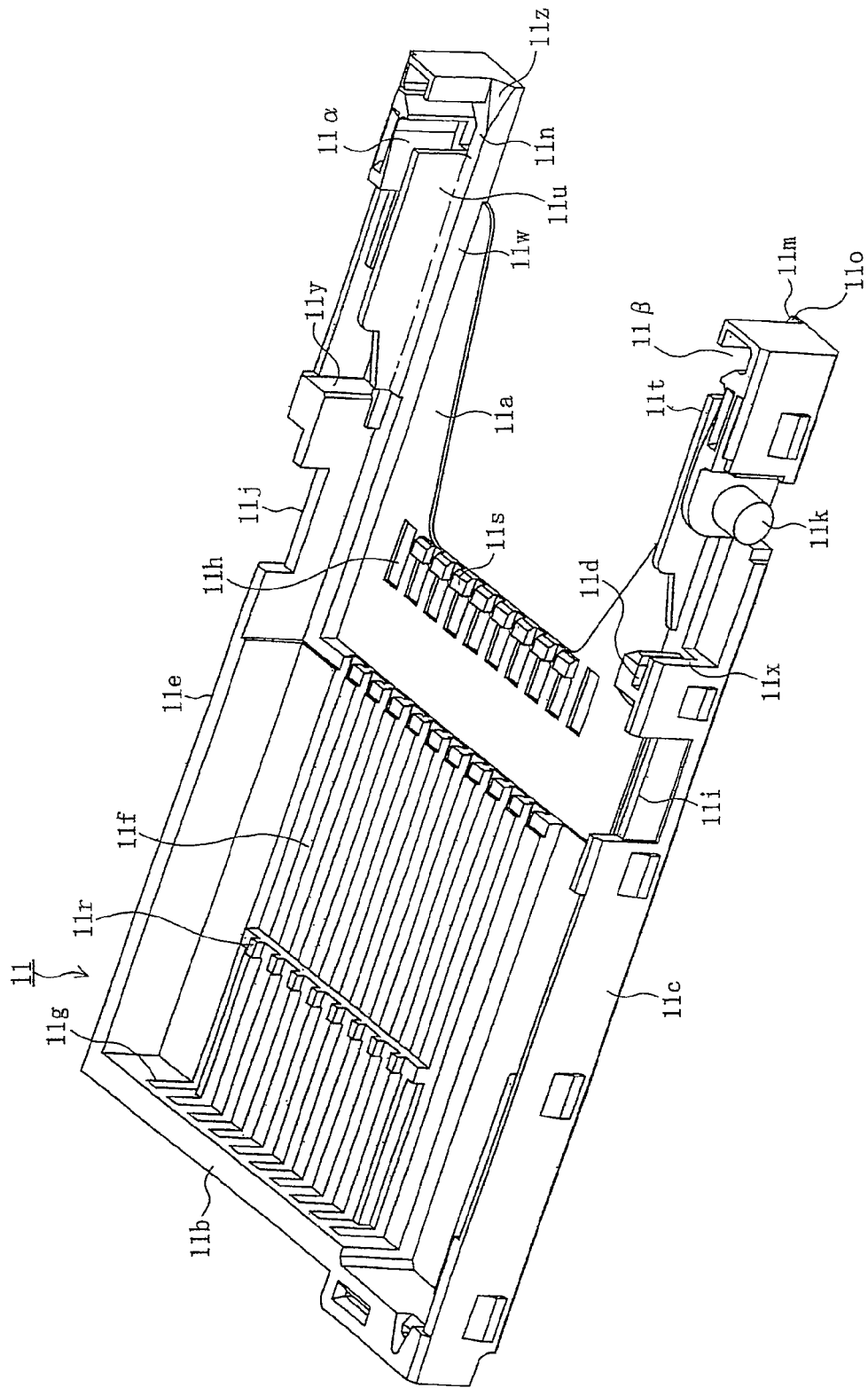
FIG. 4 is a perspective view of the housing of the card connector according to the embodiment.

As shown in FIG. 4, the housing 11 has a bottom wall 11a having a generally U-shaped cutaway extending from the front edge (the lower right side in FIG. 4) thereof; a rear wall 11b that extends along the rear edge of the bottom wall 11a and extends upright from the bottom wall 11a; a first side wall 11c extending along one side edge of the bottom wall 11a in the front-rear direction; and a second side wall 11e extending along the opposite side edge of the bottom wall 11a in the front-rear direction. The bottom wall 11a, the rear wall 11b, the first side wall 11c, and the second side wall 11e, in cooperation with the shell 12, define a card accommodation space of the card connector 10 for receiving a portion of the card 51 including at least a front end thereof.

The thickness of the bottom wall 11a at a rear half portion is larger than that at a front half portion, so that the upper surface of the rear half portion is higher than the upper surface of the front half portion. A plurality of terminal-mounting grooves 11f are formed on the upper surface of the rear half portion of the bottom wall 11a such that the grooves extend in the front-rear direction. Further, a plurality of terminal-mounting holes 11g are formed in the rear wall 11b such that the holes penetrate the rear wall 11b in the front-rear direction. Each of the terminal-mounting grooves 11f communicates with the corresponding terminal-mounting hole 11g.

The terminals 15 are attached such that the body portion of one terminal 15 is received in one terminal-mounting groove 11f, and the base or root portion of the terminal 15 is inserted into the corresponding terminal-mounting hole 11g.

As shown in FIGS. 2 and 3, each of the terminals 15 is an elongated strip-shaped member formed from a metal plate, and the rear end of the base portion is formed into a solder tail portion 15c, which projects rearward from the rear wall 11b. The solder tail portions 15c of the terminals 15 are electrically connected, by means of soldering, to counterpart terminal members; i.e., signal traces, contact pads, or terminals formed on the circuit board 14. The body portions of the terminal 15 extend frontward from the rear wall 11b, and second contact portions (second connection terminals) 15b are formed at the distal ends of the body portions such that the second contact portions 15b extend obliquely upward and toward the front edge and project upward from the upper surface of the bottom wall 11a. The second contact portions 15b are located above the front half portion of the bottom wall 11a and come into contact with card-side contact terminals of the second card 51b. Each of the second contact portions 15b functions as a cantilever having elasticity, so that the second contact portions 15b are elastically pressed against the card-side contact terminals of the second card 51b for reliable contact.

First contact portions (first connection terminals) 15a are formed at portions of the body portions near the rear wall 11b such that the first contact portions 15a extend obliquely upward and toward the rear wall 11b. The first contact portions 15a are each formed through a process of cutting a central portion of the elongated body portion to form a tongue-shaped portion and bending the tongue-shaped portion into the from of a cantilever whose base end is connected to the body portion and whose distal end is free. The body portion extends continuously across the first contact portion 15a without being cut. Each of the first contact portions 15a functions as a cantilever having elasticity, so that the first contact portions 15a are elastically pressed against the card-side contact terminals of the first card 51a for reliable contact.

Contact portion accommodation holes 11h are formed in the front half portion of the bottom wall 11a at positions under the corresponding second contact portions 15b. Second-card mis-insertion preventing projections 11s project upward from the front half portion of the bottom wall 11a at positions immediately before the contact portion accommodation holes 11h with respect to the insertion direction. If the second card 51b is inserted upside down or with from its rear end directed forward, the second-card mis-insertion preventing projections 11s come into contact with the second card 51b and prevent its advance movement, so that the second contact portions 15b are not damaged. Further, first-card mis-insertion preventing projections 11r, which project upward, are formed at positions immediately before the first contact portions 15a with respect to the insertion direction, such that the mis-insertion preventing projections 11r extend across the terminal-mounting grooves 11f. If the first card 51a is inserted upside down or with from its rear end directed forward, the first-card mis-insertion preventing projections 11r come into contact with the first card 51a and prevent its advance movement, so that the first contact portions 15a are not damaged. Notably, the first-card mis-insertion preventing projections 11r and the second-card mis-insertion preventing projections 11s are not necessary required to be formed to correspond to all the terminals 15.

As shown in FIGS. 2 and 3, a cam slider 41, which serves as a guide member of a card guide mechanism for guiding the card 51 when inserted into the card connector 10, is attached to the first side wall 11c such that it can slide in the front-rear direction. The card connector 10 is of a so-called push-in push-out type or push-push type which requires an operation of pushing the card 51 inward when the card 51 is to be inserted into the card connector 10 and when the card 51 is to be removed from the card connector 10. An urging member 45 and a pin member 44 are attached to the first side wall 11c. The urging member 45 is formed of a coil spring and adapted to urge the cam slider 41 forward. The pin member 44 comes into contact with the cam slider 41 so as to stop forward movement thereof. The opposite ends of the urging member 45 are respectively engaged with the cam slider 41 and an engagement portion lid formed on the first side wall 11c.

Figure 5:
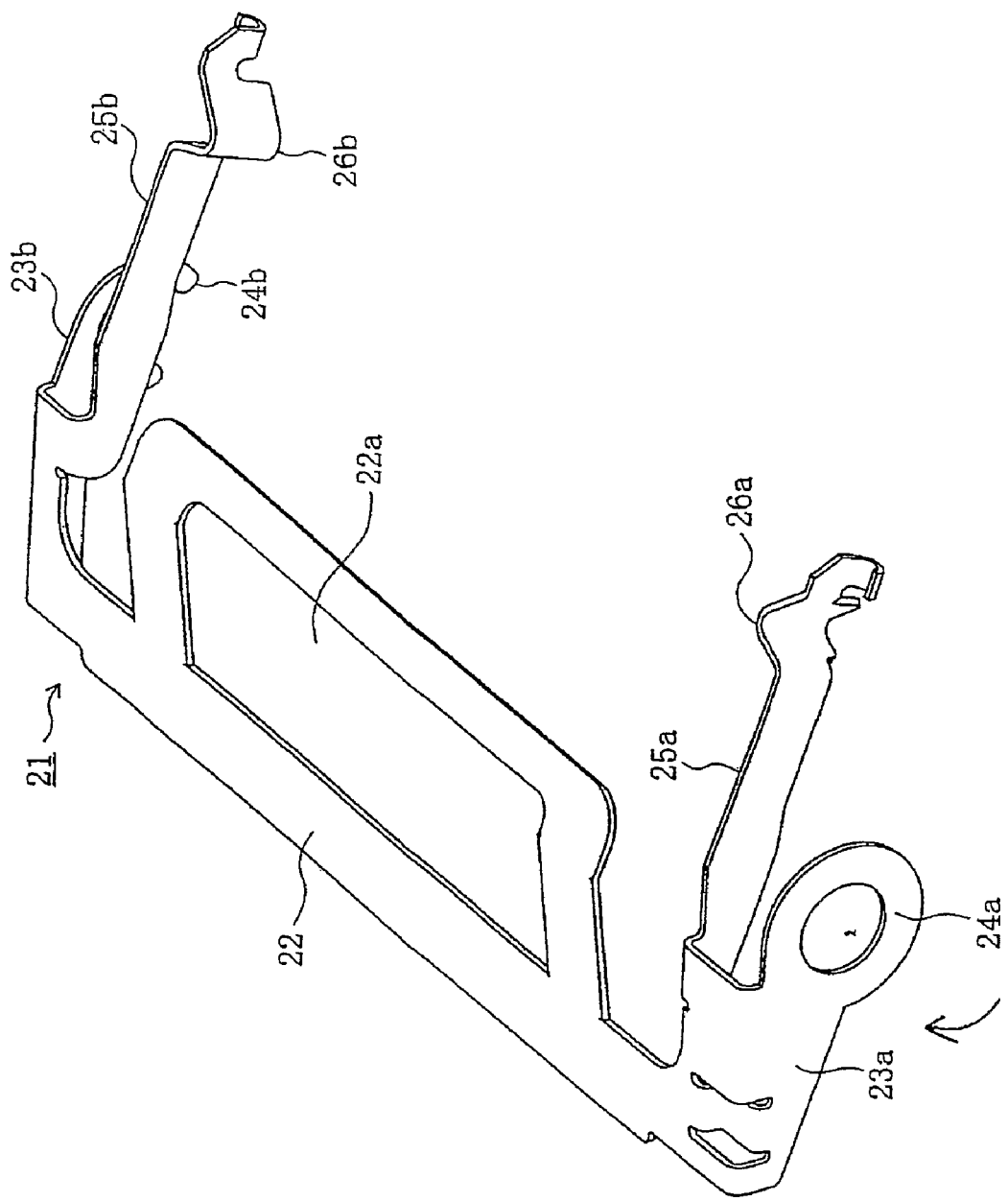
FIG. 5 is a perspective view of a changer of the card connector according to the embodiment.

As shown in FIG. 5, the changer 21 is a member which is integrally formed from a metal plate through machining processes such as punching and bending, and has a generally rectangular, flat-plate-shaped gate portion 22. In the illustrated example, the gate portion 22 has an opening 22a formed mainly for the purpose of weight reduction. However, the opening 22a may be omitted. As shown in FIG. 2, in the initial state after attachment to the housing 11, the gate portion 22 extends obliquely downward toward the rear wall 11b of the housing 11.

Frontward extending first and second arm members (swing arms) 23a and 23b are connected to the left and right sides of a rear end (left end in FIG. 5) of the gate portion 22. The first and second arm members 23a and 23b are formed to extend along respective planes perpendicular to a plane formed by the gate portion 22. The first arm member 23a has a first arm engagement portion 24a formed at its distal end for engagement with a first changer support shaft 11k formed on the first side wall 11c of the housing 11. The second arm member 23b has a second arm engagement portion 24b formed at its distal end for engagement with an unillustrated second changer support shaft formed on the second side wall 11e of the housing 11. The first arm engagement portion 24a assumes the form of an annular member having a center hole, and is rotatably fitted on the first changer support shaft 11k. The second arm engagement portion 24b assumes the form of an annular member with a lower portion thereof cut and removed, and is rotatably fitted on the second changer support shaft. Thus, the changer 21 is attached to the housing 11 to be swingably about the first changer support shaft 11k and the second changer support shaft. Notably, as shown in FIG. 2, a changer spring 27 formed of, for example, a spiral torque spring is disposed on the first changer support shaft 11k. In the initial state, the changer spring 27 urges the changer 21 to remain at its initial position, where the gate portion 22 inclines downward toward the rear wall 11b.

Moreover, first and second elongated stopper support members 25a and 25b are connected to the first and second arm portions 23a and 23b, respectively, and extend forward therefrom. First and second stopper projections (stoppers) 26a and 26b are formed on the first and second stopper support members 25a and 25b, respectively, to be located in the vicinity of distal ends thereof. The first and second stopper projections 26a and 26b project downward from the body portions of the first and second stopper support members 25a and 25b, and project inward so as to come closer to each other. Therefore, the space between the first and second stopper projections 26a and 26b is smaller than the distance between the body portions of the first and second stopper support members 25a and 25b. Moreover, in the initial state after attachment to the housing 11, as shown in FIG. 3, the space between the first and second stopper projections 26a and 26b is smaller than the width of the first card 51a and greater than the width of the second card 51b. Since the first and second stopper support members 25a and 25b each function as a cantilever having elasticity, the first and second stopper projections 26a and 26b can elastically displace in the width direction of the first card 51a, whereby the space between the first and second stopper projections 26a and 26b can be expanded.

Since the first and second stopper projections 26a and 26b are located forward of the first and second arm engagement portions 24a and 24b, when the changer 21 swings, the first and second stopper projections 26a and 26b move in the direction opposite to the direction of movement of the rear end of the gate portion 22. Specifically, when the rear end of the gate portion 22 moves upward from the initial position as shown in FIG. 2, the first and second stopper projections 26a and 26b move downward from the initial position as shown in FIG. 2. Notably, the distance between the centers of the first and second arm engagement portions 24a and 24b and the rear end edge of the gate portion 22 is approximately equal to the distance between the centers of the first and second arm engagement portions 24a and 24b and the distal end edges of the first and second arm members 23a and 23b. That is, the changer 21 swings about a central position with respect to the insertion direction. Therefore, when the changer 21 swings, the rear end edge of the gate portion 22 vertically moves by the same amount as the distal end edges of the first and second arm members 23a and 23b. Accordingly, the vertical dimension (thickness) of the card connector 10, which accommodates the changer 21, can be reduced.

As shown in FIGS. 3 and 4, the housing 11 includes first and second card-reverse-face guide portions 11m and 11n, which extend along the first and second side walls 11c and 11e from the front edge toward the rear, except for regions corresponding to card introduction taper portions 11o and 11z at the front ends. The first and second card-reverse-face guide portions 11m and 11n guide the reverse face of the first card 51a. The first and second card-reverse-face guide portions 11m and 11n are thinner than the rear half portion of the bottom wall 11a but thicker than the front half portion of the bottom wall 11a, so that their upper surfaces are lower than the upper surface of the rear half portion of the bottom wall 11a but higher than the upper surface of the front half portion of the bottom wall 11a.

First and second stopper accommodation recesses (stopper dugouts) 11p and 11q are formed on the upper surfaces of the first and second card-reverse-face guide portions 11m and 11n, respectively. As shown in FIG. 3, the first and second stopper accommodation recesses 11p and 11q have respective openings of shapes corresponding to the transverse cross sections of the first and second stopper projections 26a and 26b. The openings are formed at positions corresponding to the positions of the first and second stopper projections 26a and 26b when the space therebetween is expanded by the first card 51a. Therefore, in the initial state, since the space between the first and second stopper projections 26a and 26b is narrow, when the changer 21 is swung so as to move the rear end of the gate portion 22 upward, the lower surfaces of the first and second stopper projections 26a and 26b come into engagement with the upper surfaces of the first and second card-reverse-face guide portions 11m and 11n, and cannot move further downward, whereby the swinging motion of the changer 21 is stopped.

However, when the wide first card 51a is inserted into the card connector 10 and passed between the first and second stopper projections 26a and 26b, the space between the first and second stopper projections 26a and 26b in contact with the opposite side faces of the first card 51a is expanded, so that the first and second stopper projections 26a and 26b move to positions above the first and second stopper accommodation recesses 11p and 11q. When the changer 21 is swung so as to move the rear end of the gate portion 22 upward in this state, the first and second stopper projections 26a and 26b move downward while being accommodated within the first and second stopper accommodation recesses 11p and 11q, respectively. Therefore, the swinging of the changer 21 is not stopped, whereby the rear end of the gate portion 22 can be moved upward.

Moreover, first and second card-side-face guide walls 11t and 11u are formed upright on the upper surfaces of the first and second card-reverse-face guide portions 11m and 11n such that these guide walls extend from the front edges toward the rear. The space between the first and second card-side-face guide walls 11t and 11u is approximately equal to or slightly greater than the width of the first card 51a, so that these guides walls guide the opposite side faces of the first card 51a. Although the body portions of the first and second stopper support members 25a and 25b are disposed on the outer side of the first and second card-side-face guide walls 11t and 11u, respectively, the first and second stopper projections 26a and 26b of the first and second stopper support members 25a and 25b in the initial state project inward from cut portions 11α and 11β formed in the vicinity of the ends of the first and second card-side-face guide walls 11t and 11u, respectively.

Notably, mutually facing side surfaces of the first and second card-reverse-face guide portions 11m and 11n serve as first and second card-side-face guide portions 11v and 11w extending from the front edge toward the rear. The space between the first and second card-side-face guide portions 11v and 11w is smaller than the width of the first card 51a, but is approximately equal to or slightly greater than the width of the second card 51b, so that the first and second card-side-face guide portions 11v and 11w guide the opposite side faces of the second card 51b.

Figure 6:
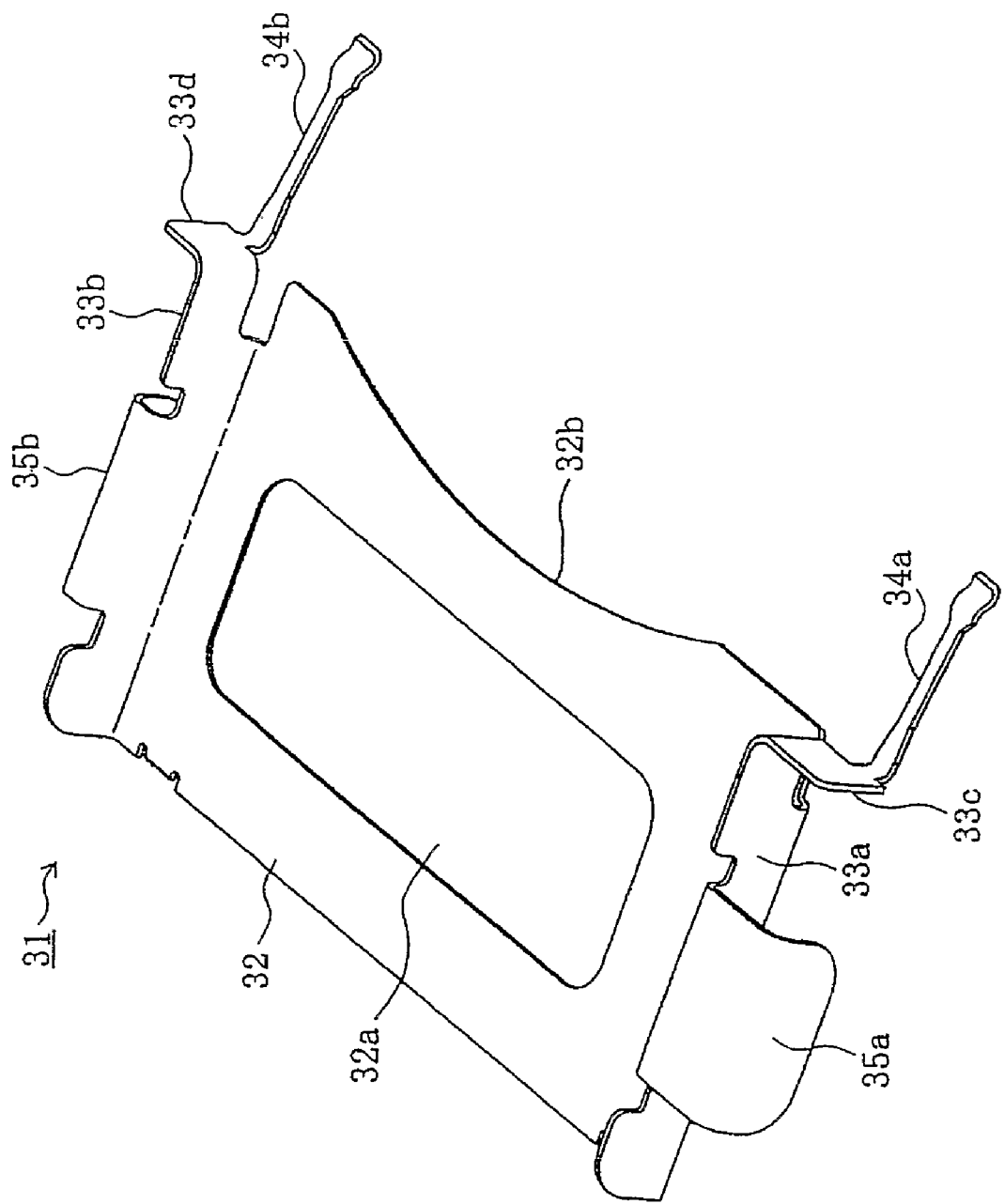
FIG. 6 is a perspective view of an inner shell of the card connector according to the embodiment.

As shown in FIG. 6, the inner shell 31 is a member which is integrally formed from a metal plate through machining processes such as punching and bending, and has a generally rectangular, flat-plate-shaped pressure-receiving portion 32. In the illustrated example, the pressure-receiving portion 32 has an opening 32a formed mainly for the purpose of weight reduction. However, the opening 32a may be omitted. First and second upright side wall portions 33a and 33b extend from the opposite side ends of the pressure-receiving portion 32. In a state in which the inner shell 31 is attached to the housing 11, the outer side surfaces of the first and second side wall portions 33a and 33b of the inner shell 31 come into sliding contact with the inner side surfaces of the first and second side walls 11c and 11e of the housing 11.

Moreover, first and second distal end wall portions 33c and 33d extend outward from the distal ends (right ends in FIG. 6) of the first and second side wall portions 33a and 33b. Notably, as shown in FIG. 4, first and second inner-shell guide portions 11x and 11y are formed upright on the first and second side walls 11c and 11e of the housing 11 such that the guide portions face the distal end side. In a state in which the inner shell 31 is attached to the housing 11, the rear side surfaces of the first and second distal end wall portions 33c and 33d of the inner shell 31 are in sliding contact with the first and second inner-shell guide portions 11x and 11y of the housing 11, respectively.

Further, first and second engagement portions 35a and 35b extend outward from the upper ends of the first and second side wall portions 33a and 33b. Distal ends of the first and second engagement portions 35a and 35b are bent downward so that the first and second engagement portions 35a and 35b have inverted-U-like and J-like cross sections, respectively.

As shown in FIG. 4, the first and second side walls 11c and 11e of the housing 11 have first and second inner-shell engagement portions 11i and 11j having cutaway portions formed on the upper ends thereof. In a state in which the inner shell 31 is attached to the housing 11, the first and second engagement portions 35a and 35b of the inner shell 31 come into engagement with the first and second inner-shell engagement portions 11i and 11j of the housing 11.

Moreover, first and second elongated plate spring portions (inner-shell urging members) 34a and 34b extend in a lower front direction from the lower ends of the first and second distal end wall portions 33c and 33d. The first and second plate spring portions 34a and 34b each function as a cantilever having elasticity, and their distal ends (fee ends) project downward from the pressure-receiving portion 32 and come into contact with the upper surface of the front half portion of the bottom wall 11a. Therefore, in the initial state in which the inner shell 31 is attached to the housing 11 as shown in FIG. 2, the inner shell 31 is urged upward and raised by means of the first and second plate spring portions 34a and 34b, and the reverse surface of the pressure-receiving portion 32 is separated from the upper surface of the front half portion of the bottom wall 11a. In the initial state, the distal end edge of the pressure-receiving portion 32 is located at a height approximately equal to that of the rear end edge of the gate portion 22 of the changer 21. Further, with respect to the front-rear direction, the clearance between the distal end edge of the pressure-receiving portion 32 and the rear end edge of the gate portion 22 is very small. Moreover, although not illustrated, the lower surfaces of the first and second engagement portions 35a and 35b are separated from the upper ends of the cutaway portions of the first and second inner-shell engagement portions 11i and 11j.

In the initial state, the distance between the reverse surface of the pressure-receiving portion 32 and the upper surface of the front half portion of the bottom wall 11a is smaller than the thickness of the first card 51a, and is approximately equal to or slightly greater than the thickness of the second card 51b. Therefore, the second card 51b can be inserted into the space between the reverse surface of the pressure-receiving portion 32 in the initial state and the upper surface of the front half portion of the bottom wall 11a. In this case, the pressure-receiving portion 32 functions as the top wall of a passageway into which the second card 51b is inserted. Notably, since upward movement of the inner shell 31 is restricted by means of the shell 12 attached to the housing 11, the inner shell 31 never moves upward from the position shown in FIG. 2. That is, in the initial state, the inner shell 31 is located at the uppermost position.

Since the inner shell 31 is urged upward and raised by means of the first and second plate spring portions 34a and 34b, when a downward force greater than the total urging force of the first and second plate spring portions 34a and 34b is applied to the inner shell 31, the inner shell 31 moves downward. When the inner shell 31 is located at the lowest position, the distance between the top surface of the pressure-receiving portion 32 and the lower surface of the top wall portion of the shell 12 is approximately equal to or slightly greater than the thickness of the first card 51a. Therefore, the first card 51a can be inserted into the space between the top surface of the pressure-receiving portion 32 moved downward and the lower surface of the top wall portion of the shell 12. In this case, the pressure-receiving portion 32 functions as the bottom wall of a passageway into which the first card 51a is inserted. Notably, since the distance between the first and second side wall portions 33a and 33b is approximately equal to or slightly greater than the width of the first card 51a, the first and second side wall portions 33a and 33b can function as guides for the opposite side faces of the first card 51a.

The structure of the cam slider 41 will now be described in detail.

Figure 7:
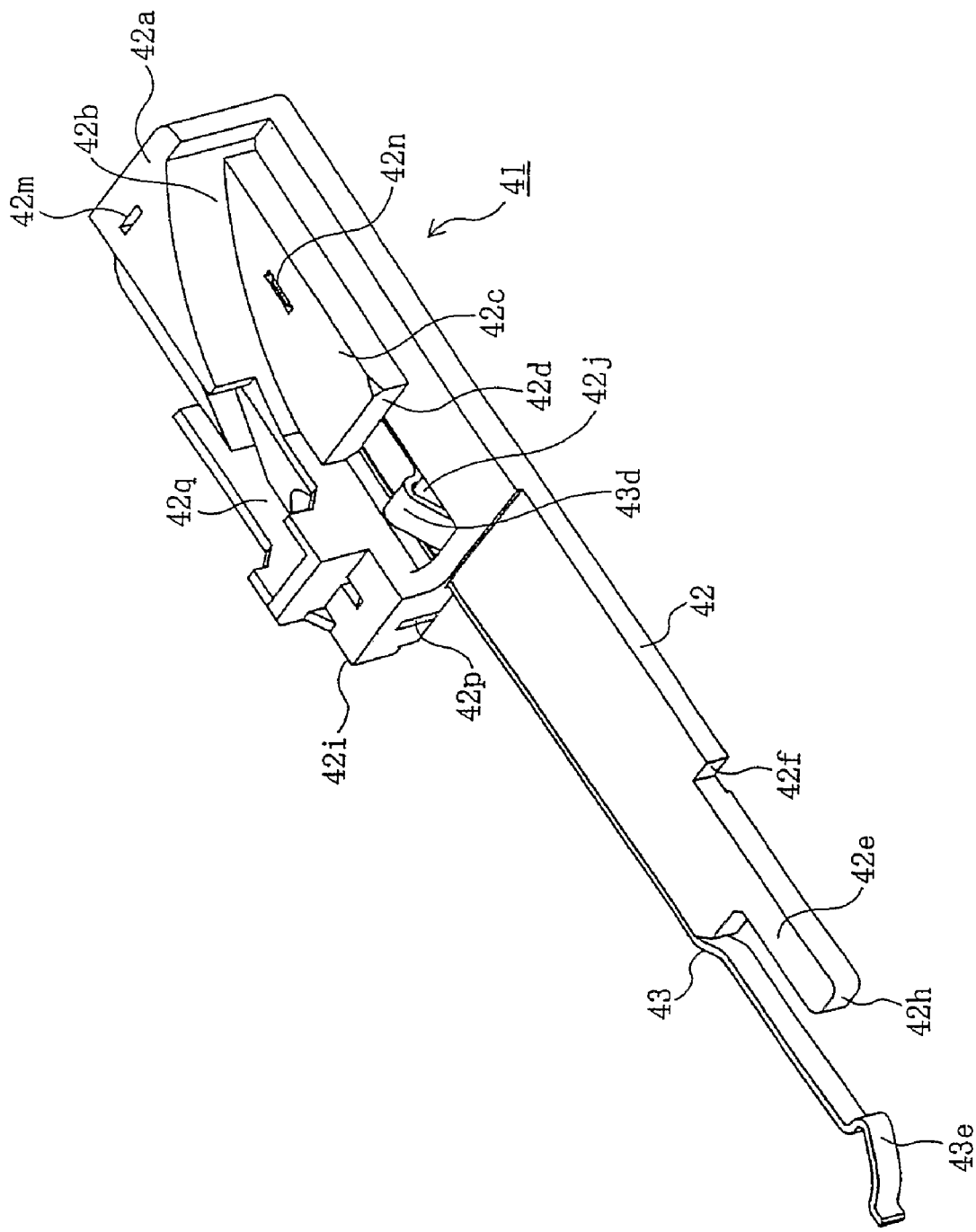
FIG. 7 is a perspective view of a cam slider of the card connector according to the embodiment as viewed from the upper side.
Figure 8:
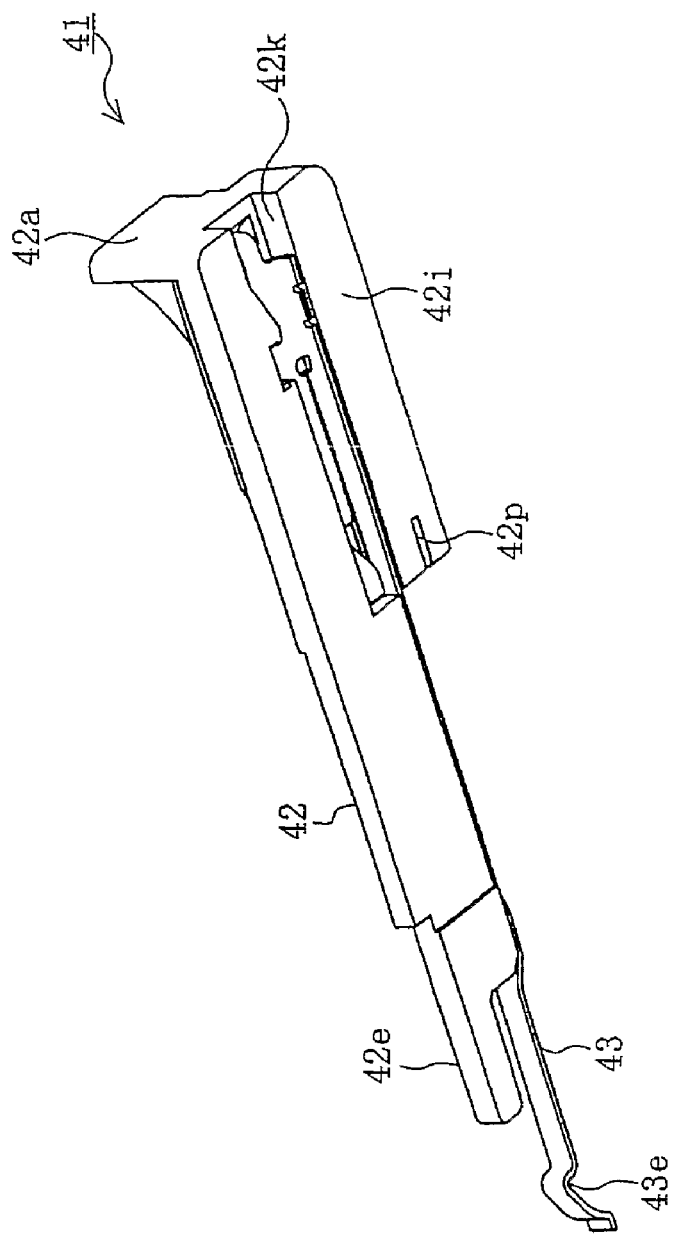
FIG. 8 is a perspective view of the cam slider of the card connector according to the embodiment as viewed from the lower side.
Figure 9:
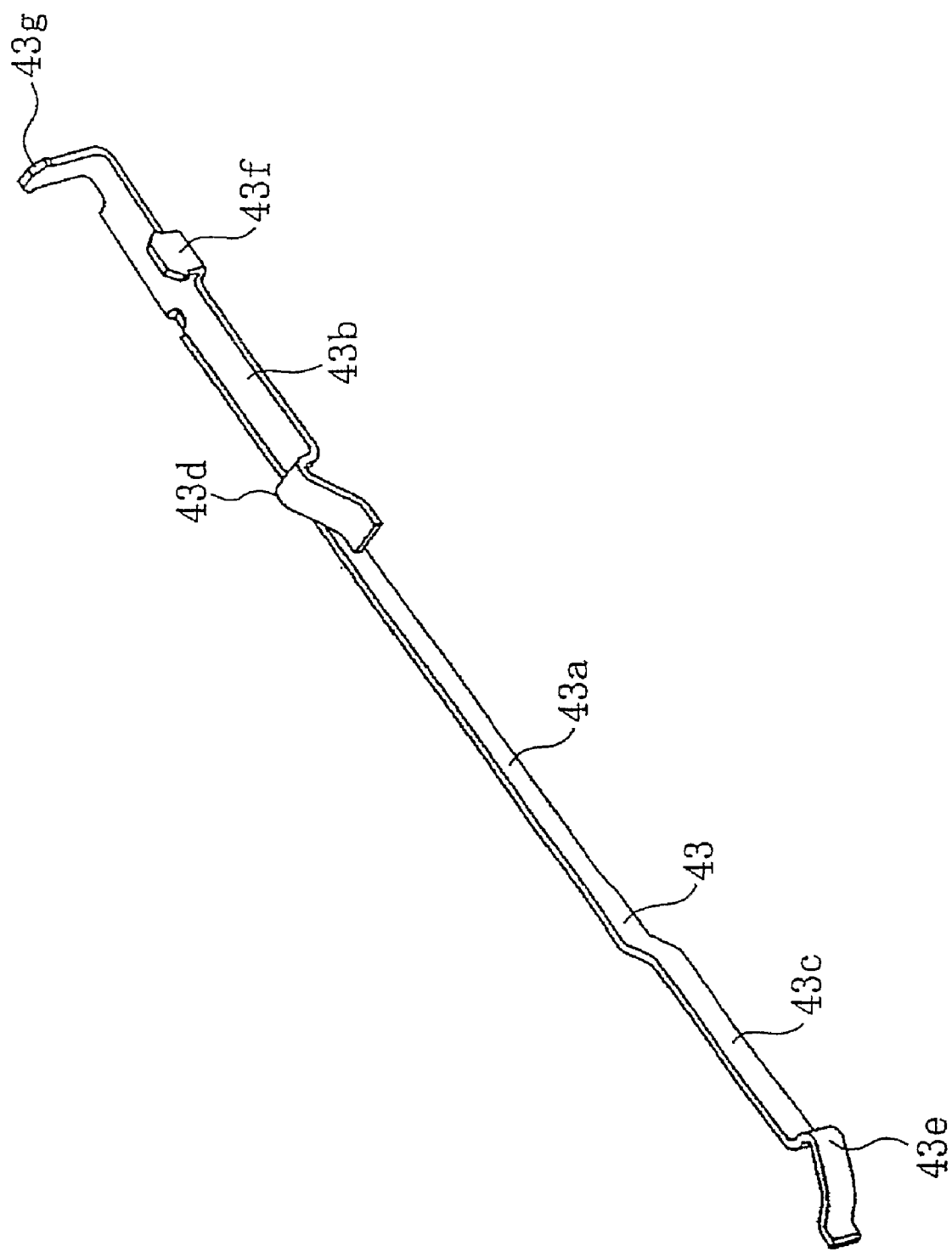
FIG. 9 is a perspective view of a lock terminal of the card connector according to the embodiment.

FIG. 7 is a perspective view of the cam slider of the card connector according to the embodiment as viewed from the upper side; FIG. 8 is a perspective view of the cam slider of the card connector according to the embodiment as viewed from the lower side; and FIG. 9 is a perspective view of a lock terminal of the card connector according to the embodiment.

As shown in FIG. 7, the cam slider 41 includes a slider member 42 integrally formed from an insulating material such as synthetic resin; and an elongated lock terminal 43 formed of a metal plate. The slider member 42 includes a thick first block portion 42a and a second block portion 42c thinner than the first block portion 42a formed at the rear end (upper right end in FIG. 7) of an elongated rectangular body portion extending in the front-rear direction.

The first block portion 42a has a first butting portion (first engagement portion) 42b, which is a side surface perpendicular to the upper surface of the body portion and is composed of a first surface section which is perpendicular to the longitudinal direction of the body portion and faces frontward (lower left in FIG. 7) and a second surface section which extends obliquely frontward from the first surface section. The first butting portion 42b has a shape corresponding to the shape of the left-hand corner of the front end of the first card 51a with respect to the insertion direction. The front and side surfaces of the left-hand front corner of the first card 51a inserted into the card connector 10 come into engagement with the first butting portion 42b.

The second block portion 42c has a first-card mis-insertion prevention portion (mis-insertion prevention surface) 42d, which is a side surface perpendicular to the upper surface of the body portion and composed of a surface which is perpendicular to the longitudinal direction of the body portion and faces frontward. If the first card 51a is inserted upside down or with from its rear end directed forward and the first-card mis-insertion preventing projections 11r of the housing 11 fail to prevent advance movement of the first card 51a, the first-card mis-insertion prevention portion 42d prevents the advance movement of the first card 51a, so that the first contact portions 15a are not damaged. Notably, the first-card mis-insertion prevention portion 42d sufficiently provides the function of preventing the advance movement of the first card 51a inserted upside down or with from its rear end directed forward, in a state in which the rear end of the slider member 42 comes into engagement with the rear wall 11b of the housing 11 and the slider member 42 becomes unable to move further rearward. Further, since a recess having a shape corresponding to the second block portion 42c is formed on the reverse face of the first card 51a at the left-hand front corner thereof, when the first card 51a is inserted with a proper orientation, the second block portion 42c is received within the recess.

Moreover, the slider member 42 has a projection portion 42e projecting forward from the front end of the body portion. The slider member 42 has a second butting portion (second engagement portion) 42f at a cutaway portion formed on the side of the projection portion 42e. The second butting portion 42f is a side surface perpendicular to the upper surface of the body portion and is composed of a surface which is perpendicular to the longitudinal direction of the body portion and faces frontward. The second butting portion 42f receives (comes into engagement with) a lower portion of the front surface of the left-hand corner of the front end of the second card 51b with respect to the insertion direction. The slider member 42 also has a third butting portion (second engagement portion) 42h at the distal end of the projection portion 42e. The third butting portion 42h is a side surface perpendicular to the upper surface of the body portion and is composed of a surface which is perpendicular to the longitudinal direction of the body portion and faces frontward. The third butting portion 42h receives (comes into engagement with) a deeper side surface of a recess formed on the reverse face of the second card 51b at the left-hand front corner of the second card 51b.

The third butting portion 42h functions as a second-card mis-insertion prevention portion as well. If the second card 51b is inserted upside down or with from its rear end directed forward and the second-card mis-insertion preventing projections 11s of the housing 11 fail to prevent advance movement of the second card 51b, the third butting portion 42h prevents the advance movement of the second card 51b, so that the second contact portions 15b are not damaged. Notably, the third butting portion 42h sufficiently provides the function of preventing the advance movement of the second card 51b inserted upside down or with from its rear end directed forward, in a state in which the rear end of the slider member 42 comes into engagement with the rear wall 11b of the housing 11 and the slider member 42 becomes unable to move further rearward.

Furthermore, the slider member 42 includes a cam block portion 42i which is formed at the rear end of the body portion to be located on the side of the first block 42a. The cam block 42i has a cam groove 42q formed on the top surface thereof. The cam block 42i cooperates with the pin member 44 in engagement with the cam groove 42q so as to impart push-push motion to the slider member 42, which moves together with the card 51. Notably, the pin member 44 is engaged with the cam groove 42q at its one end, and is engaged with the rear wall 11b of the housing 11 at its other end. Since a cam mechanism for realizing the push-push motion, such as the cam block portion 42i, is conventionally known, its description is omitted. Further, an engagement portion 42p is formed on the front end of the cam block portion 42i, and one end of an urging member 45 is engaged with the engagement portion 42p.

As shown in FIG. 9, the lock terminal 43 includes an elongated body portion 43a extending in the front-rear direction; a cantilever-shaped first lever portion 43b extending frontward from the rear end of the body portion 43a; and a cantilever-shaped second lever portion 43c extending frontward from the front end of the body portion 43a. The first lever portion 43b is bent to become substantially perpendicular to the body portion 43a and parallel to the upper surface of the body portion of the slider member 42. A first locking portion 43d is formed at the front end of the first lever portion 43b such that the first locking portion 43d projects upward. A second locking portion 43e is formed at the front end of the second lever portion 43c such that the second locking portion 43e projects inward or sideward and assumes a curved shape. The first lever portion 43b and the second lever portion 43c each function as a cantilever having elasticity, and therefore, the first locking portion 43d and the second locking portion 43e can be elastically displaced. First and second press-fitting projections 43g and 43f project upward from the rear end and side surface of the first lever portion 43b for engagement with the slider member 42.

As shown in FIG. 8, a lock-terminal accommodation recess 42k is formed on the reverse surface of the slider member 42. The lock terminal 43 is attached to the slider member 42 in such a manner that a portion of the body portion 43a and the first lever portion 43b are received within the lock-terminal accommodation recess 42k. First and second press-fitting recesses 42m and 42n are formed on the first block portion 42a and the second block portion 42c, respectively, of the slider member 42. The lock terminal 43 is secured to the slider member 42 through press-fitting of the first and second press-fitting projections 43g and 43f into the first and second press-fitting recesses 42m and 42n. Moreover, a lock opening 42j is formed in the body portion of the slider member 42, and the first locking portion 43d is accommodated within the lock opening 42j such that the first locking portion 43d projects upward from the upper surface of the body portion.

Since the first locking portion 43d is urged by means of elastic force of the first lever portion 43b, the first locking portion 43d can be elastically displaced in the vertical direction. Thus, the first locking portion 43d can come to engagement with the engagement recess formed on the reverse face of the first card 51a at the left side end in the vicinity of the front end with respect to the insertion direction, when the first card 51a is inserted into the card connector 10. Notably, the engagement recess has an opening which extends continuously from the reverse face to the left side face of the first card 51a; and the upwardly projecting first locking portion 43d enters the engagement recess from the opening on the reverse face of the first card 51a, and comes into engagement therewith. Notably, the first locking portion 43d comes into engagement with the engagement recess in a state in which the front and side surfaces of the left-hand front corner of the first card 51a is in engagement with the first butting portion 42b. By virtue of this configuration, the cam slider 41 can move in the front-rear direction together with the first card 51a, while holding the first card 51a.

Since the second locking portion 43e is urged by means of elastic force of the second lever portion 43c, the second locking portion 43e can be elastically displaced in the horizontal direction. Thus, the second locking portion 43e can come into engagement with the engagement recess formed on the reverse face of the second card 51b at the left side end in the vicinity of the front end with respect to the insertion direction, when the second card 51b is inserted into the card connector 10. Notably, the engagement recess has an opening which extends continuously from the reverse face to the left side face of the second card 51b; and the sideward projecting second locking portion 43e enters the engagement recess from the opening on the left side face of the second card 51b, and comes into engagement therewith. Notably, the second locking portion 43e comes into engagement with the engagement recess in a state in which a lower portion of the front surface of the left-hand front corner of the second card 51b is in engagement with the second butting portion 42f and the deeper side surface of the recess formed on the reverse face of the second card 51b at the left-hand front corner thereof is in engagement with the third butting portion 42h. By virtue of this configuration, the cam slider 41 can move in the front-rear direction together with the second card 51b, while holding the second card 51b.

The urging member 45 whose one end is coupled with the cam slider 41 urges the cam slider 41 in the direction opposite the insertion direction of the card 51; i.e., toward the front. When the card 51 moves in the insertion direction and reaches the end point as a result of a push operation of pushing the card 51 in the insertion direction, the cam slider 41 moves the card 51 from the end point in the direction opposite the insertion direction by means of the urging force of the urging member 45.

During a push operation for loading the card 51 into the card connector 10, upon receipt of force which the user applies to the card 51 with his/her finger or the like, the cam slider 41 moves, together with the card 51, within the card connector 10 toward the rear wall 11b thereof. When the cam slider 41 reaches the end portion, which is the most advanced position, the cam slider 41 enters the fully stroked state. Subsequently, when the force applied to the card 51 by the user is removed, the cam slider 41 and the card 51 move in a direction away from the rear wall 11b; i.e., toward the insertion opening of the card connector 10, while receiving the repulsive force of the urging member 45. The cam slider 41 and the card 51 then stop at a lock position where the card 51 is held within the card connector 10 in a locked state. With this operation, the card 51 is loaded at a predetermined position within the card connector 10.

Further, during a push operation for ejecting the card 51 from the card connector 10, upon receipt of force which the user applies to the card 51 with his/her finger or the like, the cam slider 41 moves, together with the card 51, within the card connector 10 from the lock position toward the rear wall 11b. When the cam slider 41 reaches the end portion, which is the most advanced position, the cam slider 41 enters the fully stroked state. Subsequently, when the force applied to the card 51 by the user is removed, the cam slider 41 and the card 51 move toward the insertion opening of the card connector 10, while receiving the repulsive force of the urging member 45. The cam slider 41 and the card 51 pass through the lock position and further move in the direction opposite the insertion direction of the card 51. With this operation, the card 51 is ejected from the card connector 10.

In these push operations, the cam slider 41 behaves in the same way for both the case where the card 51 is the first card 51a and the case where the card 51 is the second card 51b. That is, the cam slider 41 is a device common to the first card 51a and the second card 51b.

Meanwhile, in the lock position, it is desired to strengthen the function of the cam slider 41 for holding the card 51 to thereby prevent the loaded card 51 from shifting from the lock position; i.e., to lock the card 51.

In the case where the card 51 is the first card 51a, the function of the cam slider 41 for holding the first card 51a can be strengthened by increasing the elasticity of the first lever portion 43b to thereby increase the engagement force with which the first locking portion 43d comes into engagement with the engagement recess of the first card 51a. The elasticity of the first lever portion 43b can be increased by shortening the free length of the first lever portion 43b. In view of this, desirably, a member for partially restricting downward displacement of the first lever portion 43b is provided on the housing 11 at a position which corresponds to the reverse side of the first lever portion 43b when the cam slider 41 is located at the lock position. For example, it is desired to dispose a projection or a like member which comes into engagement with the reverse side of an intermediate portion of the first lever portion 43b.

In the case where the card 51 is the second card 51b, the function of the cam slider 41 for holding the second card 51b can be strengthened by increasing the elasticity of the second lever portion 43c to thereby increase the engagement force with which the second locking portion 43e comes into engagement with the engagement recess of the second card 51b. The elasticity of the second lever portion 43c can be increased by shortening the free length of the second lever portion 43c. In view of this, desirably, a member for partially restricting leftward displacement of the second lever portion 43c is provided on the housing 11 at a position which corresponds to the reverse side of the second lever portion 43c when the cam slider 41 is located at the lock position. For example, it is desired to dispose a projection or a like member which comes into engagement with the reverse side of an intermediate portion of the second lever portion 43c.

By virtue of the above-described configuration, the function of the cam slider 41 for holding the card 51 can be strengthened, whereby the card 51 is held in a locked state. Notably, even when the card 51 is in the locked state, the first locking portion 43d and the second locking portion 43e can be displaced. Therefore, the user attempts to pull the card 51 toward the insertion opening of the card connector 10 with a force stronger than that in the ordinary case, the card 51 is released from the locked state. That is, the card connector 10 allows forced removal of the card 51. Further, when the cam slider 41 is located at a position other than the lock position, the cam slider 41 holds the card 51 with a certain holding force at all times. That is, the cam slider 41 has a provisionally holding function. Therefore, even when the card 51 is ejected from the card connector 10 as a result of the push operation for ejection from the card connector 10, the card 51 is held by the cam slider 41, so that the card 51 does not shoot out from the insertion opening of the card connector 10. Notably, since the ejected card 51 is held with weak force, when the user removes the card 51 from the card connector 10 with his/her finger or the like, the user can easily remove the card 51 without applying strong force.

In the present embodiment, the lock terminal 43 is configured such that the first lever portion 43b is bent to become approximately perpendicular to the body portion 43a; the first lever portion 43b and the second lever portion 43c extend on two planes which perpendicularly intersect each other; and the direction of projection and displacement of the first locking portion 43d perpendicularly intersects the direction of projection and displacement of the second locking portion 43e. However, the lock terminal 43 may be configured such that the first lever portion 43b and the second lever portion 43c extend on two parallel planes; and the direction of projection and displacement of the first locking portion 43d is the same as the direction of projection and displacement of the second locking portion 43e. In the present embodiment, the lock terminal 43 is a member formed separately from the slider member 42. However, the lock member 43 may be formed integrally with the slider member 42. For example, the slider member 42 and the lock member 43 can be formed as a single member by use of metal or synthetic resin.

Next, operations of the card connector 10 having the above-described structure will be described. First, an operation of inserting the first card 51a into the card connector 10 will be described.

Figure 10:
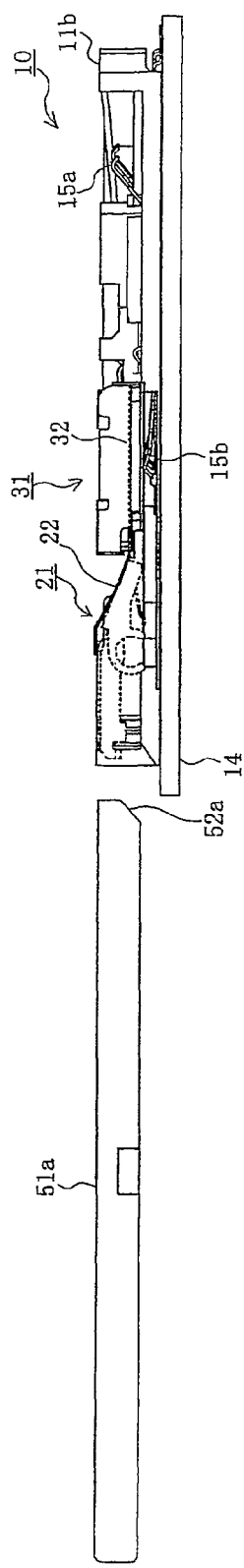
FIG. 10 is a side view of the card connector according to the embodiment, showing a state in which a large card is ready for insertion.
Figure 11:
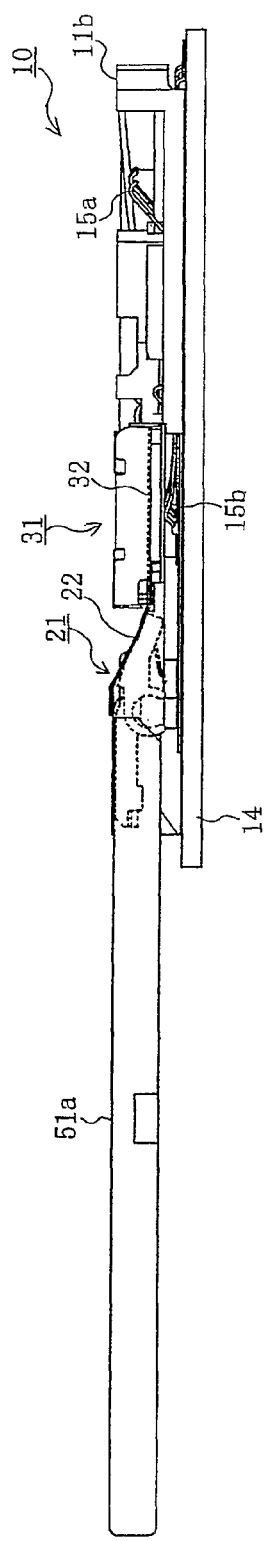
FIGS. 11 to 13 are side views of the card connector according to the embodiment, showing a state in which the large card is being inserted.
Figure 12:
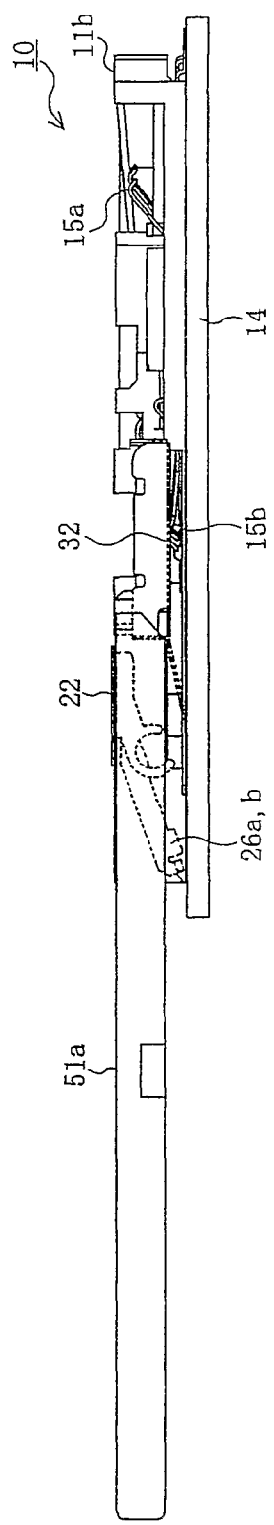
Figure 13:
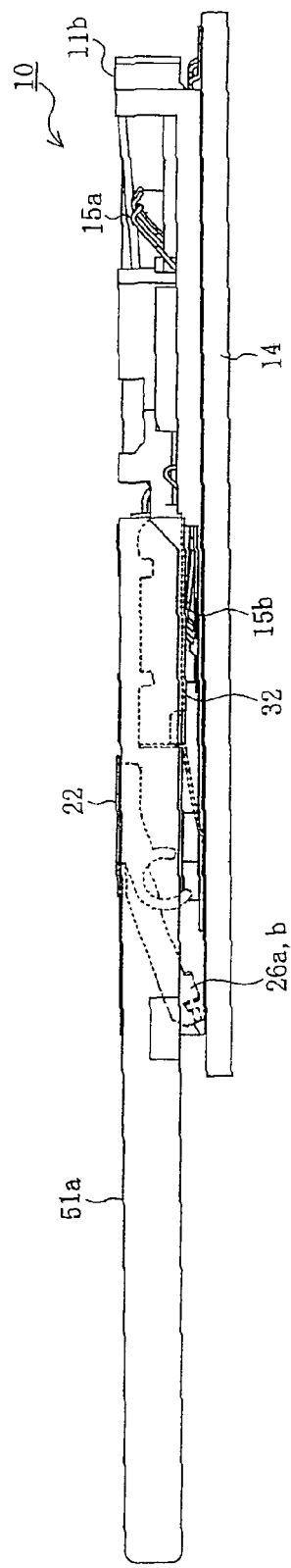
Figure 14:
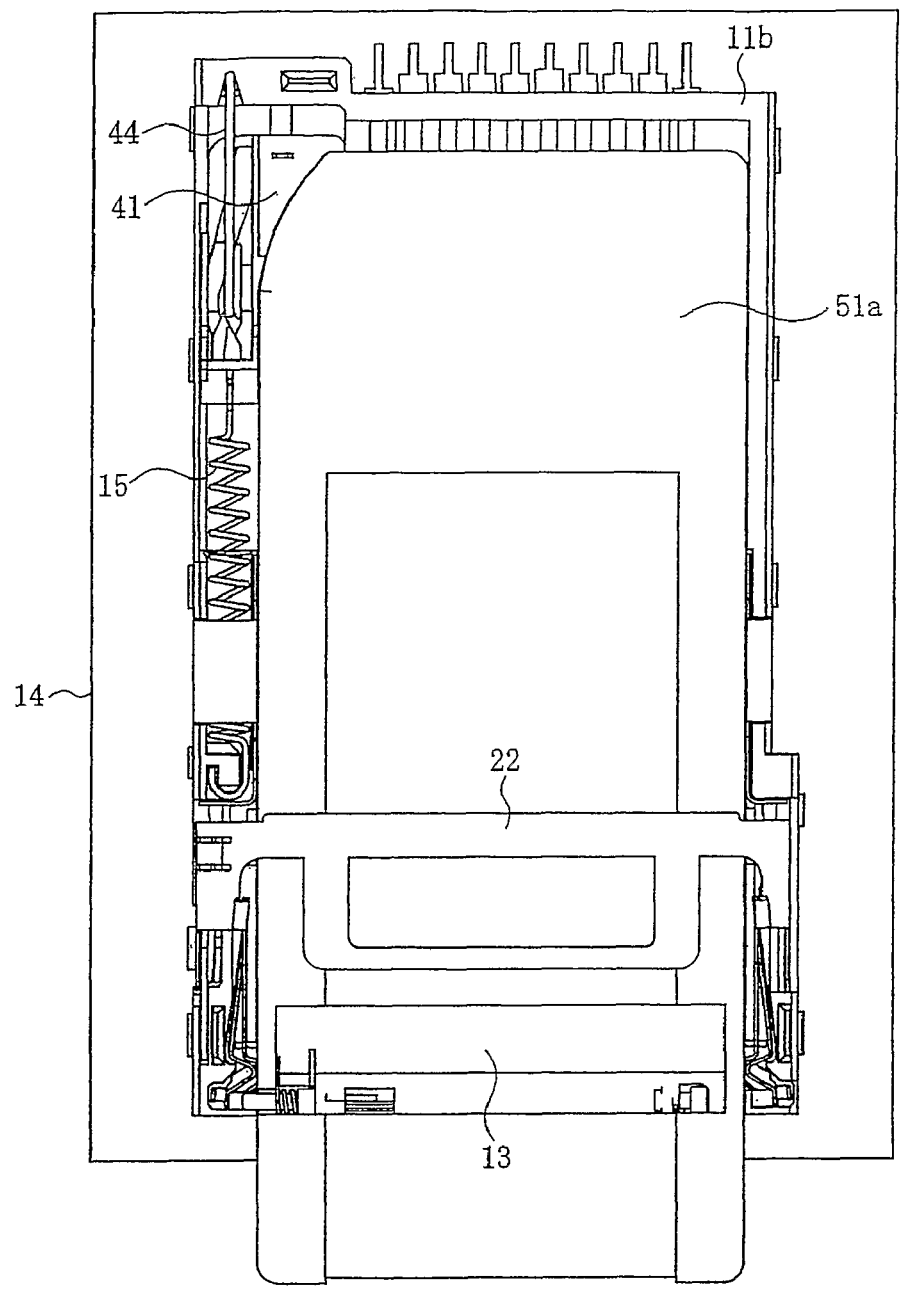
FIG. 14 is a plan view of the card connector according to the embodiment, showing a state in which loading of the large card is completed.

FIG. 10 is a side view of the card connector according to the embodiment, showing a state in which a large card is ready for insertion; FIGS. 11 to 13 are side views of the card connector according to the embodiment, showing a state in which the large card is being inserted; and FIG. 14 is a plan view of the card connector according to the embodiment, showing a state in which loading of the large card is completed.

FIGS. 10 to 14 show a state where the shell 12 is removed in order to facilitate description. FIGS. 10 to 13 show partially-sectioned views of the card connector 10. FIG. 10 shows a state in which the first card 51a is positioned in front of the insertion opening of the card connector 10 immediately before insertion of the first card 51a. Notably, in the illustrated example, the first card 51a is assumed to be properly oriented with respect to the card connector 10; i.e., the first card 51a is held neither upside down nor with from its rear end directed forward. That is, the first card 51a is oriented such that unillustrated card-side connection terminals are located on the lower surface in the vicinity of the right end in FIG. 10. As can be seen from FIG. 10, a first chamfer portion 52a is formed along the lower edge of the front end of the first card 51a with respect to the insertion direction. In the illustrated example, the first chamfer portion 52a is an inclined flat surface which obliquely extends downward toward the rear from the front end of the first card 51a and which extends in the width direction of the first card 51a. The first chamfer portion 52a may be any surface, for example, a curved surface, which is called "R-surface", so long as the surface smoothes the corner of the lower edge of the front end of the first card 51a with respect to the insertion direction.

In this case, the card connector 10 is in the initial state. Therefore, the shutter plate 13 (not shown in FIG. 10) is urged by the shutter spring to close the insertion opening; the gate portion 22 of the changer 21 is urged by the changer spring 27 to remain at the initial position where the gate portion 22 inclines downward toward the rear wall 11b of the housing 11; and the pressure-receiving portion 32 of the inner shell 31 is urged by the first and second plate spring portions 34a and 34b to remain at the initial position where the pressure-receiving portion 32 is raised to a vertical position equal to that of the rear end edge of the gate portion 22.

FIG. 11 shows the state after the first card 51a has been moved toward the rear end 11b of the card connector 10 so as to insert a front end portion of the first card 51a into the card accommodation space of the card connector 10 through the insertion opening. In this state, the front end of the first card 51a is located immediately before the distal end edge of the gate portion 22 of the changer 21. Further, the first and second stopper projections 26a and 26b of the changer 21 come into contact with the opposite side faces of the first card 51a, so that the space between the first and second stopper projections 26a and 26b is widened, and the first and second stopper projections 26a and 26b move to positions above the first and second stopper accommodation recesses 11p and 11q formed on the upper surfaces of the first and second card-reverse-face guide portions 11m and 11n, respectively, of the housing 11. That is, the stoppers are released. Notably, the reverse face of the first card 51a comes into contact with the upper surfaces of the first and second card-reverse-face guide portions 11m and 11n and are guided thereby; and the opposite side faces of the first card 51a are guided by the first and second card-side-face guide walls 11t and 11u.

When the first card 51a is further moved toward the rear wall 11b of the card connector 10, the upper edge of the front end of the first card 51a comes into contact with the downwardly inclined gate portion 22, and pushes the gate portion 22 upward. In this case, since the stoppers are released so as to enable the changer 21 to swing, when the pushing force applied from the first card 51a to the gate portion 22 exceeds the urging force of the changer spring 27, the changer 21 swings, and the gate potion 22 moves upward, whereby the first card 51a is allowed to pass under the gate portion 22. Notably, since the reverse face of the first card 51a are guided by the upper surfaces of the first and second card-reverse-face guide portions 11m and 11n, even when the first card 51a receives reaction force from the gate portion 22, the first card 51a does not move downward. With the swing motion of the changer 21, the first and second stopper projections 26a and 26b are moved downward, while being accommodated within the first and second stopper accommodation recesses 11p and 11q. At this time, the gate portion 22 restricts upward movement of the first card 51a and urges the first card 51a from above.

When the first card 51a is further moved toward the rear wall 11b of the card connector 10, the first chamfer portion 52a of the front end of the first card 51a comes into contact with the distal end edge of the pressure-receiving portion 32 of the inner shell 31. At least the upper end of the first chambered portion 52a is located higher than the pressure-receiving portion 32 at the initial position. When the first card 51a is moved in the state in which the first chamfer portion 52a is in contact with the distal end edge of the pressure-receiving portion 32, a downward pushing force is applied to the pressure-receiving portion 32 because the first chamfer portion 52a inclines downward toward the rear. Notably, since the upper face of the first card 51a is in contact with the reverse surface of the gate portion 22 and is guided thereby, even when the first card 51a receives reaction force from the pressure-receiving portion 32, the first card 51a does not move upward. When the pushing force applied from the first card 51a to the pressure-receiving portion 32 exceeds the total urging force of the first and second plate spring portions 34a and 34b, as shown in FIG. 12, the pressure-receiving portion 32 moves downward, whereby the first card 51a is allowed to pass above the pressure-receiving portion 32. That is, the clearance between the rear end edge of the gate portion 22 and the distal end edge of the pressure-receiving portion 32 as measured in the thickness direction of the first card 51a is smaller than the thickness of the first card 51a. This configuration prevents mis-insertion, as described later.

When the first card 51a is further moved toward the rear wall 11b of the card connector 10, as shown in FIG. 13, the reverse face of the first card 51a comes into contact with the upper surface of the pressure-receiving portion 32 moved downward, and is guided thereby. In this case, a clearance is produced between the reverse surface of the pressure-receiving portion 32 and the upper surface of the front half portion of the bottom wall 11a of the housing 11, and the second contact portions 15b are located in the clearance. However, since the inner shell 31 is located at the lowest position, and the first and second engagement portions 35a and 35b are in engagement with the first and second inner-shell engagement portions 11i and 11j of the housing 11, the pressure-receiving portion 32 does not move further downward. Therefore, the second contact portions 15b are not strongly pushed downward by the pressure-receiving portion 32 or the first card 51a. Further, since the pressure-receiving portion 32 intervenes between the first card 51a and the second contact portions 15b, the second contact portions 15b do not come into contact with the reverse face of the first card 51a when the first card 51a pass above the pressure-receiving portion 32. Therefore, the second contact portions 15b are prevented from interfering with the reverse face of the first card 51a, and the second contact portions 15b are not damaged.

When the first card 51a is further moved toward the rear wall 11b of the card connector 10, the front and side surfaces of the left-hand front corner of the first card 51a come into engagement with the first butting portion 42b of the cam slider 41, and the engagement recess formed on the reverse face of the first card 51a at the left side end in the vicinity of the front end thereof comes into engagement with the first locking portion 43d of the cam slider 41. As a result, the first card 51a is provisionally held by the cam slider 41, and moves together with the cam slider 41. In this case, the first-card mis-insertion preventing projections 11r are disposed immediately before the first contact portions 15a of the bottom wall 11a. However, since the first chamfer portion 52a, which is provided at the front end of the first card 51a and is inclined downward toward the rear, comes into engagement with the first-card mis-insertion preventing projections 11r, the first card 51a can smoothly ride on the first-card mis-insertion preventing projections 11r, so that the first card 51a can move without receiving any resistance.

When the first card 51a is further moved toward the rear wall 11b of the card connector 10, the cam slider 41 moves together with the first card 51a, reaches the end point (most advanced position), and enters the fully stroked state.

When the force applied to the first card 51a for moving the first card 51a toward the rear wall 11b of the card connector 10 is removed, the cam slider 41 and the first card 51a receives a repulsive force from the urging member 45, and moves in the direction away from the rear wall 11b; i.e., toward the insertion opening of the card connector 10. The cam slider 41 and the first card 51 then stop at the lock position where the first card 51a is held within the card connector 10 in a locked state. With this operation, as shown in FIG. 14, the first card 51a is loaded at a predetermined position within the card connector 10. In the state in which the first card 51a is loaded within the card connector 10, the first contact portions 15a of the terminals 15 come into contact with and are electrically connected with the card-side connection terminals of the first card 51a disposed on the reverse face thereof in the vicinity of the front end thereof. Further, since the cam slider 41 is in the lock position, the first card 51a is being locked by the cam slider 41, so that movement of the first card 51a in the front-rear direction is prevented.

As described above, when the first card 51a is inserted into the card accommodation space of the card connector 10, the changer 21 determines that the inserted card 51 is the first card 51a having larger outer dimensions, and swings so as to direct the first card 51a to the upper side of the card accommodation space and cause the first card 51a to pass through a passageway above the inner shell 31. In this case, the inner shell 31 severs as the bottom wall of the upper passageway to thereby define the passageway for the first card 51a and prevent damage to the second contact portions 15b.

When the first card 51a loaded into the card connector 10 is to be removed, the first card 51a is moved toward the rear wall 11b of the card connector 10. As a result, the cam slider 41 moves together with the first card 51a, reaches the end point (most advanced position), and enters the fully stroked state.

When the force applied to the first card 51a for moving the first card 51a toward the rear wall 11b of the card connector 10 is removed, the cam slider 41 and the first card 51a receives a repulsive force from the urging member 45, and moves toward the insertion opening of the card connector 10. The cam slider 41 stops when it returns to the initial position shown in FIGS. 2 and 3. In this case, since the first card 51a is held by the cam slider 41, the first card 51a stops together with the cam slider 41, and does not shoot out of the card connector 10 because of inertia. Notably, since the first card 51a is held by the cam slider 41 with weak force, the user can easily remove the card 51 from the card connector 10 by pulling the first card 51a toward the insertion opening with his/her finger or the like, without applying strong force to the first card 51a.

In this case, as the first card 51a moves toward the insertion opening, the changer 21 and the inner shell 31 operate in an order reverse to that in the case where the first card 51a is inserted, and return to their initial positions. Notably, even when the user forcedly pulls the first card 51a, which has been loaded into the card connector 10 and locked by the cam slider 41, out of the card connector 10 with a force stronger than that in the ordinary case, that is, even when the forced removal of the first card 51a is performed, as the first card 51a moves toward the insertion opening, the changer 21 and the inner shell 31 operate in an order reverse to that in the case where the first card 51a is inserted, and return to their initial positions.

Next, there will be described the case where the first card 51a is inserted upside down or with its rear end directed forward; i.e., the case of mis-insertion. Notably, descriptions regarding operations identical with those in the case where the first card 51a properly oriented as described above is inserted will be omitted.

Even in the case where the first card 51a is inserted upside down or with its rear end directed forward, when the first card 51a is moved toward the rear wall 11b of the card connector 10, the changer 21 swings, and the gate portion 22 moves upward, so that the first card 51a can pass under the gate portion 22. However, when the first card 51a is further moved toward the rear wall 11b of the card connector 10, a surface of the first card 51a, other than the first chamfer portion 52a; that is, a vertical surface of the first card 51a comes into engagement with the distal end edge of the pressure-receiving portion 32 of the inner shell 31. Therefore, advancement of the first card 51a is prohibited by the pressure-receiving portion 32, and the first card 51a cannot move toward the rear wall 11b anymore, so that neither the first contact portions 15a nor the second contact portions 15b are damaged. In this case, even when the insertion force applied to the first card 51a is strong, the entire inner shell 31 receives the force from the first card 51a with respect to the front-rear direction. Therefore, the pressure-receiving portion 32 functions as a robust mis-insertion prevention member. In this manner, the pressure-receiving portion 32 of the inner shell 31 functions as a mis-insertion prevention member, whereby mis-insertion of the first card 51a is prevented. Notably, a central portion of the distal end edge of the pressure-receiving portion 32 with respect to the width direction is cut to form a curved recess extending toward the rear wall 11b, to thereby form a curved end side 32b. This curved end side 32b is formed in consideration of a possibility that when the pressure-receiving portion 32 deforms and projects upward or downward; that is, when it warps, the central portion of the distal end edge of the pressure-receiving portion 32 does not properly come into engagement with the first card 51a.

In some cases, because of a certain cause, the pressure-receiving portion 32 may move downward, and the first card 51a may pass above the pressure-receiving portion 32. In this case as well, the pressure-receiving portion 32 intervenes between the first card 51a and the second contact portions 15b. Therefore, the second contact portions 15b are not damaged when the first card 51a passes above the pressure-receiving portion 32. However, when the first card 51a is further moved toward the rear wall 11b of the card connector 10, a surface of the first card 51a, other than the first chamfer portion 52a; that is, a vertical surface of the first card 51a comes into engagement with the first-card mis-insertion preventing projections 11r disposed immediately before the first contact portions 15a of the bottom wall 11a. Therefore, advancement of the first card 51a is prohibited by the first-card mis-insertion preventing projections 11r, and the first card 51a cannot move toward the rear wall 11b anymore, so that neither the first contact portions 15a nor the second contact portions 15b are damaged. In this manner, the first-card mis-insertion preventing projections 11r functions as a mis-insertion prevention member, whereby mis insertion of the first card 51a is prevented.

In some cases, because of a certain cause, the first card 51a may ride over the first-card mis-insertion preventing projections 11r, and may move further. However, in this case, the first-card mis-insertion prevention portion 42d of the cam slider 41 prevents advancement of the first card 51a, so that the first contact portions 15a are not damaged. In this manner, the first-card mis-insertion preventing portion 42d functions as a mis-insertion prevention member, whereby mis insertion of the first card 51a is prevented. Notably, the first-card mis-insertion prevention portion 42d sufficiently provides the function of prohibiting the advancement of the first card 51a inserted upside down or with from its rear end directed forward, in a state in which the rear end of the cam slider 41 comes into engagement with the rear wall 11b of the housing 11 and becomes unable to move further rearward.

As described above, the pressure-receiving portion 32 of the inner shell 31, the first-card mis-insertion preventing projections 11r, and the first-card mis-insertion prevention portion 42d of the cam slider 41 provide the function of prohibiting mis insertion of the first card 51a. Therefore, advancement of the first card 51a incorrectly inserted can be prohibited without fail.

Next, an operation of inserting the second card 51b into the card connector 10 will be described.

Figure 15:
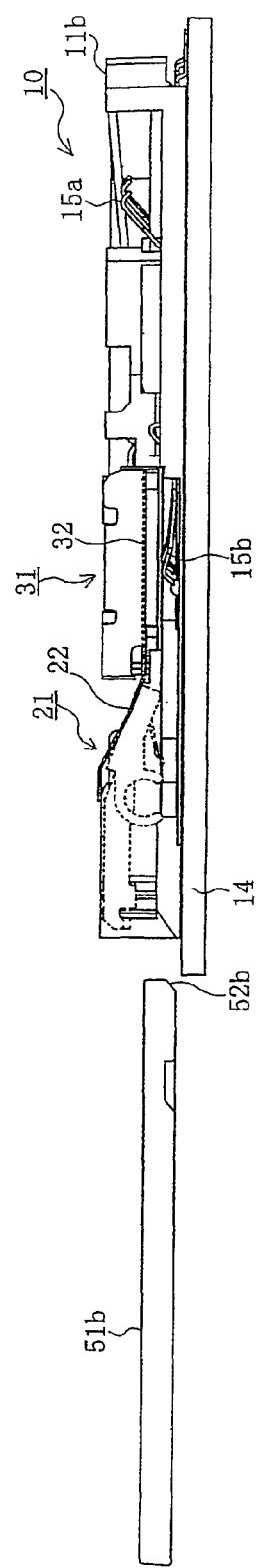
FIG. 15 is a side view of the card connector according to the embodiment, showing a state in which a small card is ready for insertion.
Figure 16:
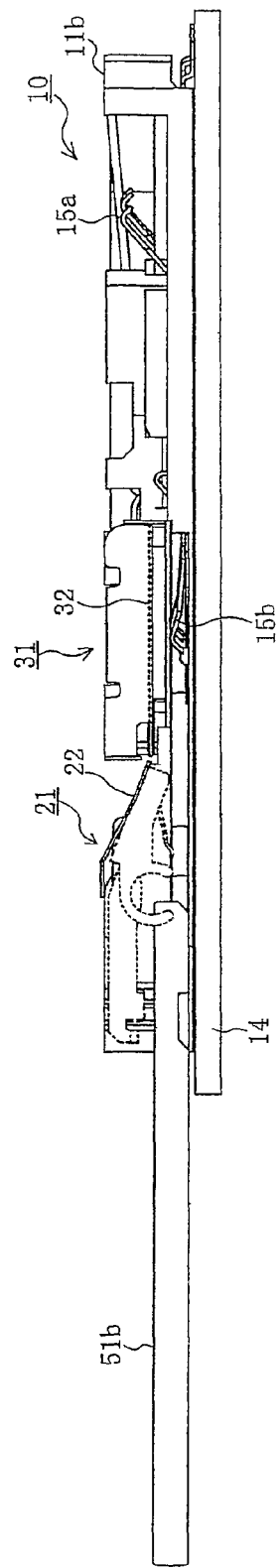
FIGS. 16 and 17 are side views of the card connector according to the embodiment, showing a state in which the small card is being inserted.
Figure 17:
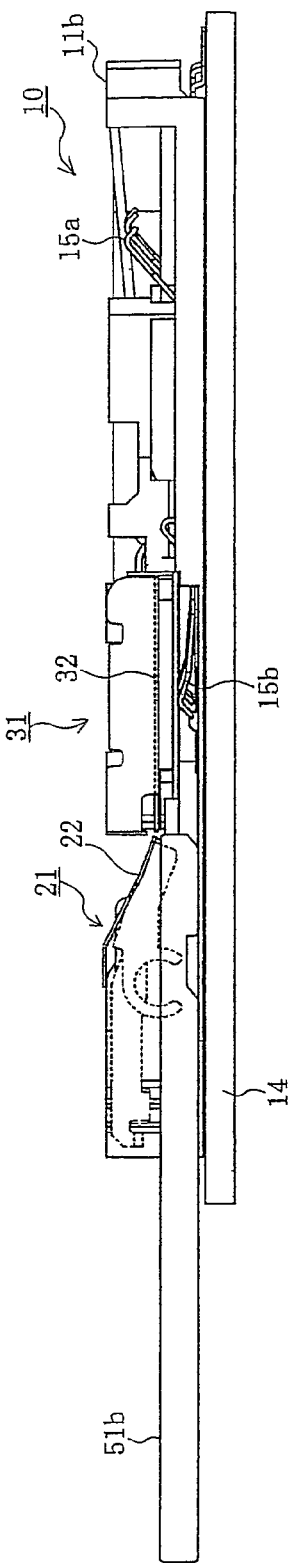

FIG. 15 is a side view of the card connector according to the embodiment, showing a state in which a small card is ready for insertion; FIGS. 16 and 17 are side views of the card connector according to the embodiment, showing a state in which the small card is being inserted; and FIG. 18 is a side view of the card connector according to the embodiment, showing a state in which loading of the small card is completed.

Figure 18:
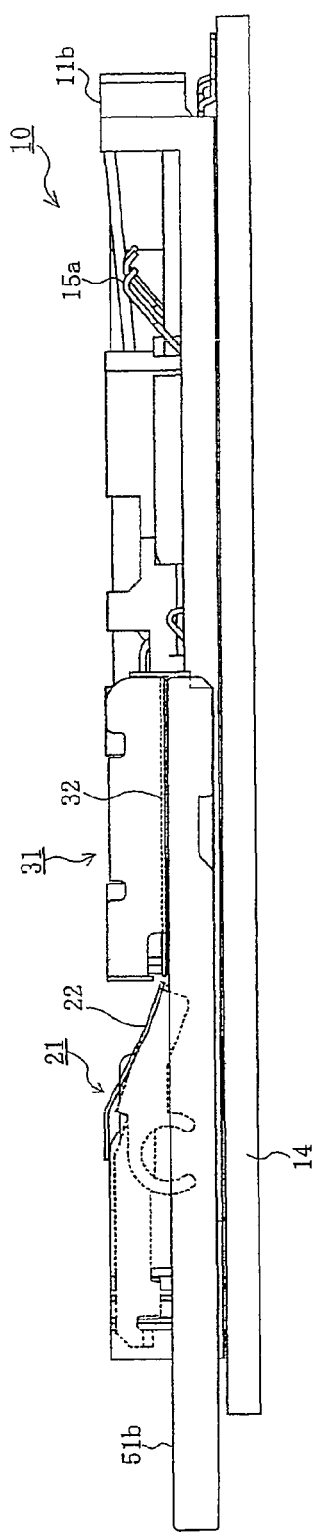
FIG. 18 is a side view of the card connector according to the embodiment, showing a state in which loading of the small card is completed.
Figure 19:
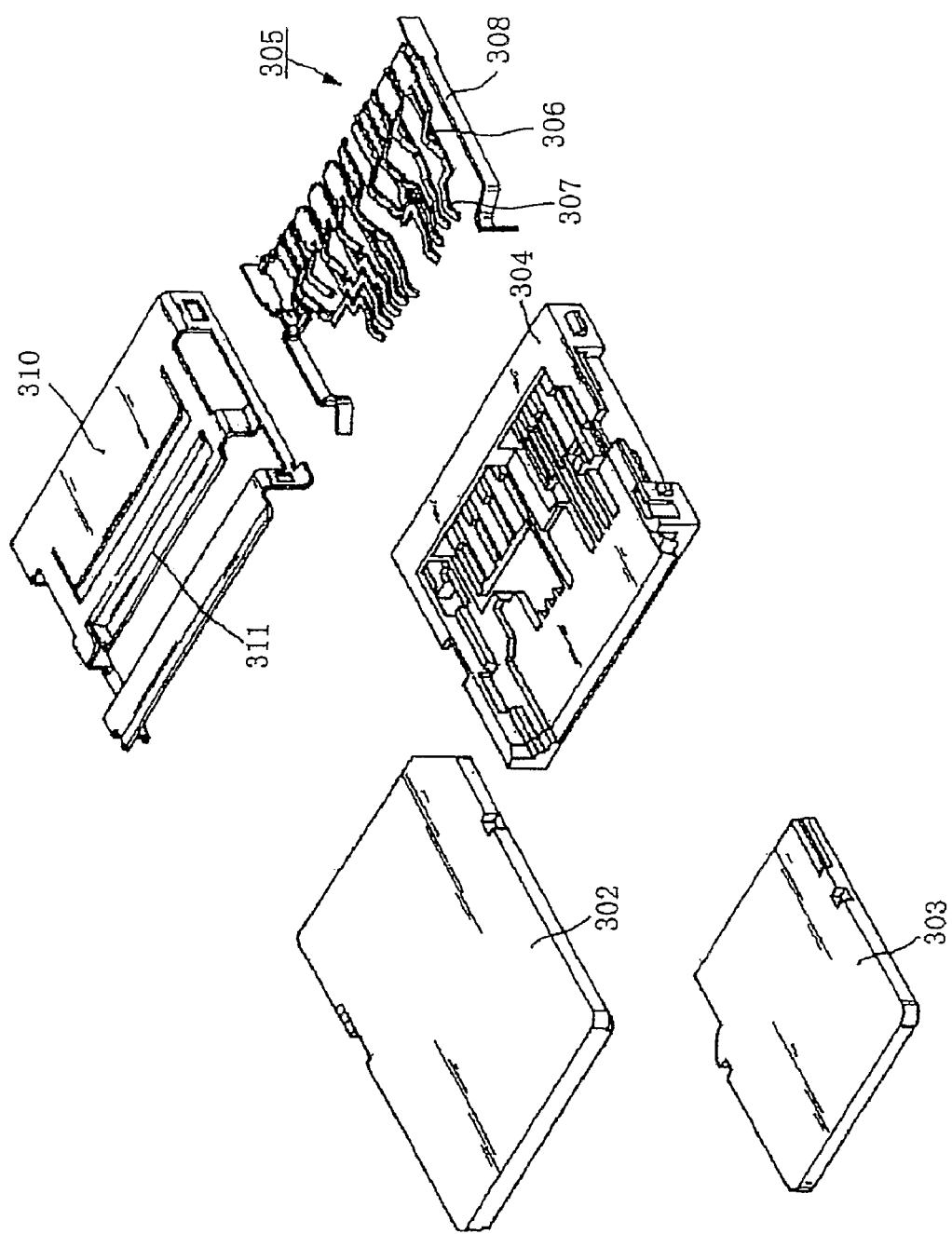
FIG. 19 is a view showing a conventional card connector.

FIGS. 15 and 18 show a state where the shell 12 is removed in order to facilitate description. FIGS. 15 to 18 show partially-sectioned views of the card connector 10. Notably, in the illustrated example, the second card 51b is assumed to be properly oriented with respect to the card connector 10; i.e., the second card 51b is held neither upside down nor with from its rear end directed forward. That is, the second card 51b is oriented such that unillustrated card-side connection terminals are located on the lower surface in the vicinity of the right end in FIG. 15. As can be seen from FIG. 15, a second chamfer portion 52b is formed along the lower edge of the front end of the second card 51b with respect to the insertion-direction. In the illustrated example, the second chamfer portion 52b is an inclined flat surface which obliquely extends downward toward the rear from the front end of the second card 51b and which extends in the width direction of the second card 51b. The second chamfer portion 52b may be any surface, for example, a curved surface, which is called "R-surface", so long as the surface smoothes the corner of the lower edge of the front end of the second card 51b with respect to the insertion direction.

In this case, the card connector 10 is in the initial state, as in the above-described case shown in FIG. 10. Therefore, the shutter plate 13 is urged by the shutter spring to close the insertion opening; the gate portion 22 of the changer 21 is urged by the changer spring 27 to remain at the initial position where the gate portion 22 inclines downward toward the rear wall 11b of the housing 11; and the pressure-receiving portion 32 of the inner shell 31 is urged by the first and second plate spring portions 34a and 34b to remain at the initial position where the pressure-receiving portion 32 is raised to a vertical position equal to that of the rear end edge of the gate portion 22.

FIG. 16 shows the state after the second card 51b has been moved toward the rear end 11b of the card connector 10 so as to insert a front end portion of the second card 51b into the card accommodation space of the card connector 10 through the insertion opening. In this state, the front end of the second card 51b is located immediately before the distal end edge of the gate portion 22 of the changer 21. Further, the width of the second card 51b is smaller than the distance between the first and second stopper projections 26a and 26b in the initial state.

Therefore, the first and second stopper projections 26a and 26b of the changer 21 do not come into contact with the opposite side faces of the second card 51b, so that the first and second stopper projections 26a and 26b remain in the initial state. That is, the stoppers are not released. Notably, the reverse face of the second card 51b comes into contact with the upper surface of the front half portion of the bottom wall 11a and is guided thereby; and the opposite side faces of the second card 51b are guided by the first and second card-side-face guide portions 11v and 11w.

When the second card 51b is further moved toward the rear wall 11b of the card connector 10, without coming into engagement with the gate portion 22, the front end of the second card 51b is located at a location below the rear end edge of the gate portion 22 and immediately before the distal end edge of the pressure-receiving portion 32 of the inner shell 31, as shown in FIG. 17. Since the distance between the rear end edge of the gate portion 22 in the initial state and the upper surface of the front half portion of the bottom wall 11a is approximately equal to or slightly greater than the thickness of the second card 51b, the second card 51b can move without coming into engagement with the gate portion 22. Further, the distance between the reverse surface of the pressure-receiving portion 32 of the inner shell 31 in the initial state and the upper surface of the front half portion of the bottom wall 11a is approximately equal to or slightly greater than the thickness of the second card 51b.

However, in the case where the second card 51b is caused to move at a relatively high position within the card accommodation space in a state in which the reverse face of the second card 51b does not come into engagement with the upper surface of the front half portion of the bottom wall 11a, the upper edge of the front end of the second card 51b comes into contact with the downwardly inclined gate portion 22, and pushes the gate portion 22 upward. However, since the first and second stopper projections 26a and 26b of the changer 21 are still in the initial state and the stoppers are not released, even when the gate portion 22 is pushed upward, the gate portion 22 cannot move upward (because the lower surfaces of the first and second stopper projections 26a and 26b come into engagement with the upper surfaces of the first and second card-reverse-face guide portions 11m and 11n and cannot move downward any more). Therefore, when the second card 51b is further moved toward the rear wall 11b of the card connector 10, the second card 51b, whose front-end upper edge is in engagement with the downwardly inclined gate portion 22, is caused to move downward along the reverse surface of the gate portion 22, and reach the position shown in FIG. 17. That is, the second card 51b is guided by the gate portion 22 to obliquely move downward.

When the second card 51b is further moved toward the rear wall 11b of the card connector 10, since the pressure-receiving portion 32 of the inner shell 31 is located higher than the upper face of the second card 51b, the second card 51b enters the space below the pressure-receiving portion 32. Since the clearance between the rear end edge of the gate portion 22 and the distal end edge of the pressure-receiving portion 32 is very small, even when the second card 51b is guided by the gate portion 22 to obliquely move downward, the second card 51b can smoothly enter the space below the pressure-receiving portion 32. When the second card 51b passes through the space below the pressure-receiving portion 32, the pressure-receiving portion 32 may receive an upward pushing force from the second card 51b, because the upper face of the second card 51b is in contact with the reverse surface of the pressure-receiving portion 32 and is guided thereby. However, since upward movement of the inner shell 31 is restricted by the shell 12 attached to the housing 11, the inner shell 31 does not move upward from the position in the initial state.

When the second card 51b is further moved toward the rear wall 11b of the card connector 10, a lower portion of the front surface of the left-hand front corner of the second card 51b and the deeper side surface of the recess formed in the reverse face of the second card 51b at the left-hand front corner thereof come into engagement with the second butting portion 42f and the third butting portion 42h, respectively, of the cam slider 41, and the engagement recess formed on the reverse face of the second card 51b at the left side end in the vicinity of the front end thereof comes into engagement with the second locking portion 43e of the cam slider 41. As a result, the second card 51b is provisionally held by the cam slider 41, and moves together with the cam slider 41. In this case, the second-card mis-insertion preventing projections 11s are disposed immediately before the second contact portions 15b of the bottom wall 11a. However, since the second chamfer portion 52b, which is provided at the front end of the second card 51b and is inclined downward toward the rear, comes into engagement with the second-card mis-insertion preventing projections 11s, the second card 51b can smoothly ride on the second-card mis-insertion preventing projections 11s, so that the second card 51b can move without receiving any resistance.

When the second card 51b is further moved-toward the rear wall 11b of the card connector 10, the cam slider 41 moves together with the second card 51b, reaches the end point (most advanced position), and enters the fully stroked state.

When the force applied to the second card 51b for moving the second card 51b toward the rear wall 11b of the card connector 10 is removed, the cam slider 41 and the second card 51b receives a repulsive force from the urging member 45, and moves in the direction away from the rear wall 11b; i.e., toward the insertion opening of the card connector 10. The cam slider 41 and the second card 51b then stop at the lock position where the second card 51b is held within the card connector 10 in a locked state. With this operation, as shown in FIG. 18, the second card 51b is loaded at a predetermined position within the card connector 10. Further, since the cam slider 41 is in the lock position, the second card 51b is being locked by the cam slider 41, so that movement of the second card 51b in the front-rear direction is prevented.

In the state in which the second card 51b is loaded within the card connector 10, the second contact portions 15b of the terminals 15 come into contact with and are electrically connected with the card-side connection terminals of the second card 51b disposed on the reverse face thereof in the vicinity of the front end thereof. In this case, the second contact portions 15b each function as a cantilever having elasticity, and are elastically pressed against the card-side connection terminals of the second card 51b. Notably, the pressure under which the second contact portions 15b come into contact with the card-side connection terminals; i.e., contact pressure, is received by the pressure-receiving portion 32, with which the upper face of the second card 51 is engaged. Therefore, the second contact portions 15b and the card-side connection terminals can reliably maintain contact therebetween.

Notably, the distance between the front end of the card connector 10 and the rear end of the second card 51b in the lock position; i.e., the amount of projection of the second card 51b from the insertion opening of the card connector 10 is equal to the amount of projection of the first card 51a from the insertion opening of the card connector 10 in the state in which the first card 51 is located at the lock position. In other words, when loaded into the card connector 10, the front end of the first card 51a having larger outer dimensions reaches the deepest position within the card accommodation space, and the front end of the second card 51b having smaller outer dimensions does not reach the deepest point within the card accommodation space, and stops at an intermediate position before the deepest position.

As described above, when the second card 51b is inserted into the card accommodation space of the card connector 10, the changer 21 determines that the inserted card 51 is the second card 51b having smaller outer dimensions, and does not swing so as to direct the second card 51b to the lower side of the card accommodation space and cause the second card 51b to pass through a passageway under the inner shell 31. In this case, the inner shell 31 severs as the top wall of the lower passageway to thereby define the passageway for the second card 51b, receives the contact pressure of the second contact portions 15b, and maintains contact between the second contact portions 15b and the card-side connection terminals.

When the second card 51b loaded into the card connector 10 is to be removed, the second card 51b is moved toward the rear wall 11b of the card connector 10. As a result, the cam slider 41 moves together with the second card 51b, reaches the end point (most advanced position), and enters the fully stroked state.

When the force applied to the second card 51b for moving the second card 51b toward the rear wall 11b of the card connector 10 is removed, the cam slider 41 and the second card 51b receives a repulsive force from the urging member 45, and moves toward the insertion opening of the card connector 10. The cam slider 41 stops when it returns to the initial position shown in FIGS. 2 and 3. In this case, since the second card 51b is held by the cam slider 41, the second card 51b stops together with the cam slider 41, and does not shoot out of the card connector 10 because of inertia. Notably, since the second card 51b is held by the cam slider 41 with weak force, the user can easily remove the card 51 from the card connector 10 by pulling the second card 51b toward the insertion opening with his/her finger or the like, without applying strong force to the second card 51b.

In this case, as the second card 51b moves toward the insertion opening, the changer 21 and the inner shell 31 are maintained at their initial positions. Notably, even when the user forcedly pulls the second card 51b, which has been loaded into the card connector 10 and locked by the cam slider 41, out of the card connector 10 with a force stronger than that in the ordinary case, that is, even when the forced removal of the second card 51b is performed, the changer 21 and the inner shell 31 are maintained at their initial positions.

Next, there will be described the case where the second card 51b is inserted upside down or with its rear end directed forward; i.e., the case of mis-insertion. Notably, descriptions regarding operations identical with those in the case where the second card 51b properly oriented as described above is inserted will be omitted.

Even in the case where the second card 51b is inserted upside down or with its rear end directed forward, when the second card 51b is moved toward the rear wall 11b of the card connector 10, the second card 51b can pass under the gate portion 22, and enter the space under the pressure-receiving portion 32. However, when the second card 51b is further moved toward the rear wall 11b of the card connector 10, a surface of the second card 51b, other than the second chamfer portion 52b; that is, a vertical surface of the second card 51b comes into engagement with the second-card mis-insertion preventing projections 11s disposed immediately before the second contact portions 15b of the bottom wall 11a. Therefore, advancement of the second card 51b is prohibited by the second-card mis-insertion preventing projections 11s, and the second card 51b cannot move toward the rear wall 11b anymore, so that the second contact portions 15b are not damaged. In this manner, the second-card mis-insertion preventing projections 11s functions as a mis-insertion prevention member, whereby mis-insertion of the second card 51b is prevented.

In some cases, because of a certain cause, the second card 51b may ride over the second-card mis-insertion preventing projections 11s, and may move further. However, in this case, the third butting portion 42h of the cam slider 41 prevents advancement of the second card 51b, so that the second contact portions 15b are not damaged. In this manner, the third butting portion 42h functions as a second mis-insertion prevention member, whereby mis-insertion of the second card 51b is prevented. Notably, the third butting portion 42h sufficiently provides the function of prohibiting the advancement of the second card 51b inserted upside down or with from its rear end directed forward, in a state in which the rear end of the cam slider 41 comes into engagement with the rear wall 11b of the housing 11 and becomes impossible to move rearward.

As described above, the second-card mis-insertion preventing projections 11s and the third butting portion 42h of the cam slider 41 provide the function of prohibiting mis insertion of the second card 51b. Therefore, advancement of the second card 51b incorrectly inserted is prohibited without fail.

As described above, the card connector 10 according to the present embodiment includes the changer 21 swingably attached to the housing 11 at a position between the second connection terminals 15b and the insertion opening and adapted to determine whether the inserted card is the first card 51a or the second card 51b and direct the same to an upper side or a lower side; and the inner shell 31 vertically movably attached to the housing 11 at a position opposite the insertion opening with respect to the changer 21 and adapted to serve as a bottom wall of a passageway for the first card 51a or a top wall of a passageway for the second card 51b.

The changer 21 includes the first and second stopper projections 26a and 26b for disabling, at an initial position, the changer 21 from swinging. The first and second stopper projections 26a and 26b are released upon insertion of the first card 51a into the insertion opening and enable the changer 21 to swing.

The changer 21 is urged by the changer spring 27, serving as an urging member, to return to the initial position.

The changer 21 includes the plate-shaped gate portion 22, which extend downward toward a direction opposite the insertion opening in the initial state. The changer 21 moves upward and becomes parallel to the insertion direction when the changer 21 swings from the initial position.

The changer 21 swings about a swing center defined with respect to the insertion direction; the first and second stopper projections 26a and 26b are located on one side of the swing center toward the insertion opening; and the gate portion 22 is located on the other side of the swing center opposite the insertion opening.

When a front end of the first card 51a with respect to the insertion direction comes into contact with the gate portion 22, the changer 21 swings from the initial position, so that the gate portion 22 moves upward and serves as the top wall of the passageway for the first card 51a; and when a front end of the second card 51b with respect to the insertion direction comes into contact with the gate portion 22, the changer 21 does not swing from the initial position, so that the gate portion 22 guides the second card 51*b* in a downwardly inclined direction.

The inner shell 31 includes the first and second plate spring portions 34*a* and 34*b*, serving as an urging member, for urging the inner shell 31 upward; and a plate-shaped pressure-receiving portion 32, wherein in an initial state, the inner shell 31 is urged by the first and second plate spring portions 34*a* and 34*b*, so that the pressure-receiving portion 32 serves as the top wall of the passageway for the second card 51*b*.

The pressure-receiving portion 32 is located above the second connection terminals 15*b*.

When the first chamfer portion 52*a* formed at a lower edge of a front end of the first card 51*a* with respect to the insertion direction comes into contact with an end edge of the pressure-receiving portion 32 on the side toward the insertion opening, the inner shell 31 moves downward, so that the pressure-receiving portion 32 serves as the bottom wall of the passageway for the first card 51*a*.

Therefore, the structure of the card connector 10 can be simplified, cost can be reduced, and can be downsized. For example, each of the changer 21 and the inner shell 31 is formed integrally or as a single member, the number of parts is small, the structure is simple, assembly is easy, and cost can be reduced. Further, cards 51 of a plurality of types; i.e., the first card 51*a* and the second card 51*b*, can be loaded into the card connector 10 easily and with certainty. Moreover, even when the changer 21 and the inner shell 31 operate, no parts project from the card connector 10. Therefore, the mounting volume required to mount the card connector 10 into an electronic device does not change even when the card 51 is loaded.

Since the changer 21 and the inner shell 31 are urged to return to their initial states. When the card 51 is inserted again after removal thereof, irrespective of whether the card 51 has been ejected properly or forcedly removed, the changer 21 can determine whether the inserted card is the first card 51*a* or the second card 51*b* and direct the same to the proper side without fail. Therefore, the first card 51*a* and the second card 51*b* are not directed to incorrect directions.

The flat gate portion 22 and the first and second stopper projections 26*a* and 26*b* are formed integrally with the changer 21. The operation of disabling and enabling the swing motion of the changer 21, and the operation of determining whether the inserted card is the first card 51*a* or the second card 51*b* and directing the same to the upper or lower side can be interlocked without fail.

In the above-described embodiment, the first card 51*a* and the second card 51*b* are a Memory Stick® and a Memory Stick Duo®, respectively. It is clear for a person skilled in the art that the first card 51*a* and the second card 51*b* may be other types of cards. For example, the present invention can be applied to the case where the first card 51*a* and the second card 51*b* are a SD® card and a mini SD® card, respectively, through proper adjustment of the shapes, dimensions, arrangements of various members described in the above-described embodiment.

The present invention is not limited to the above-described embodiments. Numerous modifications and variations of the present invention are possible in light of the spirit of the present invention, and they are not excluded from the scope of the present invention.

What is claimed is:

1. A card connector into which first and second cards may be inserted in an insertion direction, the first card having a first cross-section transverse to the insertion direction and the second card having a second cross-section transverse to the insertion direction, the first cross-section being different from the second cross-section, the connector comprising:
   a housing having an insertion opening for receiving the first card and the second card;
   a plurality of first connection terminals disposed in the housing at a position spaced from the insertion opening and configured to engage pads of the first card;
   a plurality of second connection terminals disposed in the housing at a position between the first connection terminals and the insertion opening and configured to engage pads of the second card; and
   a guide member movably attached to the housing at a position between the second connection terminals and the insertion opening and adapted to engage an inserted card and direct the inserted card to one of a first path and a second path;
   wherein the guide member is pivotally movable between first and second positions to guide the inserted card to one of the first and second paths.

2. The card connector according to claim 1, further including a movable member aligned with the insertion opening, configured to serve as a bottom wall of a first passageway upon insertion of the first card into the connector and a top wall of a second passageway upon insertion of the second card into the connector.

3. The card connector according to claim 2, wherein the movable member includes an urging member for urging the movable member upward, and a plate-shaped pressure-receiving portion, wherein in an initial state, the movable member is urged by the urging member so that the plate-shaped pressure-receiving portion serves as the top wall of the second passageway for the second card.

4. The card connector according to claim 3, wherein the plate-shaped pressure-receiving portion is located above the second connection terminals.

5. The card connector according to claim 4, wherein upon engagement by a first card with an end edge of the plate-shaped pressure-receiving portion, the movable member moves downward, so that the plate-shaped pressure-receiving portion serves as the bottom wall of the second passageway for the first card.

6. The card connector according to claim 1, wherein the guide member further includes stoppers movable between first and second positions, wherein at the first position, the guide member is prevented from moving from its initial position, and at the second position, the guide member is released upon insertion of the first card into the insertion opening, enabling the guide member to pivot.

7. The card connector according to claim 6, wherein the guide member is urged by an urging member to return to the first position.

8. The card connector according to claim 6, wherein the guide member further includes a plate-shaped gate portion extending downward toward a direction opposite the insertion opening in an initial position, and moving upward and becoming parallel to the insertion direction when the guide member pivots from the first position.

9. The card connector according to claim 8, wherein:
   the guide member pivots about a pivot center defined with respect to the insertion direction, one of the stoppers being located on one side of the pivot center toward the insertion opening; and
   the gate portion is located on a side of the pivot center opposite the insertion opening.

10. The card connector according to claim 9, wherein:
    upon engagement of a front end of the first card with the gate portion, the guide member pivots from the initial position so that the gate portion moves upward and serves as a top wall of a first passageway for the first card; and upon engagement of a front end of the second card with the gate portion, the guide member is maintained in its initial position so that the gate portion guides the second card along a second passageway for the second card.

11. The card connector according to claim 1, wherein upon pivoting the guide member, an end edge of the guide member moves upward so that a vertical clearance smaller than the thickness of the first card is produced between the end edge of the guide member and an end edge of the movable member.

* * * * *